US010162970B2

(12) United States Patent
Olson et al.

(10) Patent No.: US 10,162,970 B2
(45) Date of Patent: *Dec. 25, 2018

(54) AUTOMATED INTELLIGENCE GRAPH CONSTRUCTION AND COUNTERMEASURE DEPLOYMENT

(71) Applicant: Accenture Global Solutions Limited, Dublin (IE)

(72) Inventors: Ryan Olson, Chantilly, VA (US); Trevor Tonn, McLean, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,600

(22) Filed: Feb. 5, 2018

(65) Prior Publication Data

US 2018/0211047 A1 Jul. 26, 2018

Related U.S. Application Data

(63) Continuation of application No. 14/190,051, filed on Feb. 25, 2014, now Pat. No. 9,886,581.

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01); *H04L 63/1441* (2013.01); *G06F 2221/033* (2013.01)

(58) Field of Classification Search
CPC ............. G06F 21/577; G06F 2221/033; H04L 63/1433; H04L 63/1441
See application file for complete search history.

(56) References Cited

U.S. PATENT DOCUMENTS

| 6,952,779 | B1 | 10/2005 | Cohen et al. |
| 7,013,395 | B1 | 3/2006 | Swiler et al. |
| 7,096,498 | B2 * | 8/2006 | Judge ............... G06F 21/554 726/22 |
| 7,530,105 | B2 | 5/2009 | Gilbert et al. |
| 7,743,421 | B2 | 6/2010 | Cosquer et al. |

(Continued)

FOREIGN PATENT DOCUMENTS

WO 2013116308 8/2013

OTHER PUBLICATIONS

Philips et al., A Graph-Based System for Network-Vulnerability Analysis, 1999, ACM, Proceedings of the 1998 workshop on New security paradigms, pp. 71-79.

(Continued)

*Primary Examiner* — Joseph P Hirl
*Assistant Examiner* — Stephen T Gundry
(74) *Attorney, Agent, or Firm* — Harrity & Harrity, LLP

(57) ABSTRACT

Techniques for providing information security threat assessment and amelioration are disclosed. The techniques may include obtaining fundamental data, obtaining document data, preparing fundamental instance nodes from the fundamental data, preparing document nodes from the document data, preparing edges between at least some of the nodes, storing the nodes and the edges in a manner that reflects a graph structure, and causing to be displayed at least a portion of a graph defined by at least one node and at least one edge.

20 Claims, 11 Drawing Sheets

(56) References Cited

U.S. PATENT DOCUMENTS

| | | | |
|---|---|---|---|
| 7,882,508 B1 | 2/2011 | Aguilera | |
| 7,974,983 B2 | 7/2011 | Goeldi | |
| 8,091,117 B2 | 1/2012 | Williams et al. | |
| 8,560,413 B1 | 10/2013 | Quarterman | |
| 8,650,170 B2 | 2/2014 | Tonn | |
| 8,832,836 B2 | 9/2014 | Thomas et al. | |
| 8,881,288 B1 | 11/2014 | Levy et al. | |
| 8,966,639 B1 | 2/2015 | Roytman et al. | |
| 8,984,643 B1 | 3/2015 | Krisher et al. | |
| 9,009,084 B2* | 4/2015 | Brandt | H04L 63/1408 706/12 |
| 9,049,222 B1 | 6/2015 | He et al. | |
| 9,118,702 B2 | 8/2015 | MaCaulay | |
| 9,119,017 B2 | 8/2015 | Sinha | |
| 9,245,114 B2 | 1/2016 | Thomas et al. | |
| 9,268,945 B2 | 2/2016 | Williams | |
| 9,292,695 B1* | 3/2016 | Bassett | G06F 21/577 |
| 9,311,480 B2* | 4/2016 | Teddy | G06F 21/51 |
| 9,319,420 B1 | 4/2016 | Franke | |
| 9,350,757 B1* | 5/2016 | Falkowitz | H04L 63/145 |
| 9,473,522 B1* | 10/2016 | Kotler | H04L 63/1433 |
| 9,548,988 B1* | 1/2017 | Roundy | H04L 63/1416 |
| 9,584,543 B2 | 2/2017 | Kaminsky | |
| 9,614,865 B2 | 4/2017 | Teddy | |
| 9,621,574 B2 | 4/2017 | Desai | |
| 9,628,507 B2 | 4/2017 | Haq | |
| 9,641,550 B2 | 5/2017 | Kraitsman et al. | |
| 9,648,039 B1 | 5/2017 | Lipinski et al. | |
| 9,661,003 B2 | 5/2017 | Parker | |
| 9,661,017 B2 | 5/2017 | Alperovitch | |
| 9,674,145 B2 | 6/2017 | Chien | |
| 9,680,857 B1 | 6/2017 | Franke et al. | |
| 9,721,099 B2 | 8/2017 | Sinclair | |
| 9,846,780 B2 | 12/2017 | Tonn et al. | |
| 9,886,581 B2 | 2/2018 | Olson et al. | |
| 2002/0038430 A1* | 3/2002 | Edwards | H04L 29/06 726/26 |
| 2003/0056116 A1 | 3/2003 | Bunker | |
| 2003/0172292 A1* | 9/2003 | Judge | G06F 21/554 726/23 |
| 2004/0006704 A1 | 1/2004 | Dahlstrom et al. | |
| 2005/0138413 A1 | 6/2005 | Lippmann | |
| 2005/0193430 A1* | 9/2005 | Cohen | G06F 21/577 726/25 |
| 2006/0053490 A1* | 3/2006 | Herz | H04L 63/1441 726/23 |
| 2006/0064740 A1* | 3/2006 | Kelley | G06F 21/577 726/3 |
| 2006/0075503 A1* | 4/2006 | Bunker | G06F 11/324 726/25 |
| 2006/0190606 A1* | 8/2006 | Kohavi | G06F 21/51 709/226 |
| 2006/0212932 A1* | 9/2006 | Patrick | H04L 63/1441 726/11 |
| 2006/0218640 A1 | 9/2006 | Lotem et al. | |
| 2007/0067847 A1 | 3/2007 | Wiemer et al. | |
| 2007/0180522 A1* | 8/2007 | Bagnall | G06F 21/55 726/22 |
| 2007/0192859 A1* | 8/2007 | Shahar | G06F 21/552 726/22 |
| 2007/0209075 A1 | 9/2007 | Coffman | |
| 2007/0226796 A1* | 9/2007 | Gilbert | G06F 21/55 726/22 |
| 2007/0261112 A1* | 11/2007 | Todd | G06F 21/577 726/11 |
| 2008/0016314 A1 | 1/2008 | Li | |
| 2008/0052758 A1* | 2/2008 | Byrnes | H04L 63/0263 726/1 |
| 2008/0098479 A1 | 4/2008 | O'Rourke | |
| 2008/0120305 A1* | 5/2008 | Sima | G06F 17/30864 |
| 2008/0120722 A1* | 5/2008 | Sima | H04L 63/1433 726/25 |
| 2009/0049553 A1* | 2/2009 | Vasudeva | G06F 21/577 726/25 |
| 2009/0077666 A1* | 3/2009 | Chen | G06F 21/577 726/25 |
| 2009/0241173 A1* | 9/2009 | Troyansky | G06F 21/552 726/5 |
| 2009/0241196 A1* | 9/2009 | Troyansky | G06F 21/552 726/25 |
| 2009/0271863 A1 | 10/2009 | Govindavajhala | |
| 2010/0058475 A1 | 3/2010 | Thummalapenta | |
| 2010/0186088 A1 | 7/2010 | Banerjee | |
| 2010/0275263 A1 | 10/2010 | Bennett | |
| 2012/0209886 A1 | 8/2012 | Henderson | |
| 2012/0254842 A1 | 10/2012 | Henderson | |
| 2012/0259895 A1 | 10/2012 | Neely, III et al. | |
| 2012/0304300 A1 | 11/2012 | Labumbard | |
| 2012/0317149 A1 | 12/2012 | Jagota et al. | |
| 2012/0323829 A1 | 12/2012 | Stokes et al. | |
| 2012/0330994 A1 | 12/2012 | Tonn | |
| 2013/0042299 A1 | 2/2013 | Osterweil et al. | |
| 2013/0046798 A1 | 2/2013 | Mankovskii et al. | |
| 2013/0074188 A1 | 3/2013 | Giakouminakis | |
| 2013/0081141 A1 | 3/2013 | Anurag | |
| 2013/0124545 A1 | 5/2013 | Holmberg et al. | |
| 2013/0124574 A1 | 5/2013 | Brettin et al. | |
| 2013/0204886 A1 | 8/2013 | Faith et al. | |
| 2013/0227684 A1 | 8/2013 | Troyansky | |
| 2013/0227695 A1 | 8/2013 | Shankar | |
| 2013/0247207 A1 | 9/2013 | Hugard | |
| 2014/0007238 A1 | 1/2014 | Magee | |
| 2014/0046982 A1 | 2/2014 | Chan | |
| 2014/0082733 A1 | 3/2014 | Benefield | |
| 2014/0173737 A1 | 6/2014 | Toback | |
| 2014/0337974 A1 | 11/2014 | Joshi et al. | |
| 2014/0344926 A1 | 11/2014 | Cunningham et al. | |
| 2014/0366132 A1 | 12/2014 | Stiansen et al. | |
| 2014/0373160 A1 | 12/2014 | Shigemoto | |
| 2015/0033287 A1 | 1/2015 | Oliphant et al. | |
| 2015/0040232 A1 | 2/2015 | Oliphant et al. | |
| 2015/0121532 A1 | 4/2015 | Barel | |
| 2015/0172311 A1 | 6/2015 | Freedman et al. | |
| 2015/0207809 A1* | 7/2015 | MacAulay | G06F 21/552 726/22 |
| 2015/0237065 A1 | 8/2015 | Roytman et al. | |
| 2015/0242637 A1 | 8/2015 | Tonn | |
| 2015/0244732 A1 | 8/2015 | Golshan | |
| 2015/0244734 A1 | 8/2015 | Olson et al. | |
| 2015/0319185 A1 | 11/2015 | Kirti et al. | |
| 2015/0365438 A1* | 12/2015 | Carver | H04L 63/1441 726/1 |
| 2015/0373039 A1* | 12/2015 | Wang | H04L 63/1425 726/23 |
| 2015/0373043 A1* | 12/2015 | Wang | G06F 21/552 726/12 |
| 2015/0373044 A1 | 12/2015 | Stiansen | |
| 2016/0012223 A1 | 1/2016 | Srivastava | |
| 2016/0012236 A1 | 1/2016 | Giakouminakis | |
| 2016/0044056 A1 | 2/2016 | Boggs | |
| 2016/0050227 A1 | 2/2016 | Desai | |
| 2016/0057166 A1* | 2/2016 | Chesla | H04L 63/02 726/23 |
| 2016/0065598 A1* | 3/2016 | Modi | G06F 21/577 726/23 |
| 2016/0065599 A1* | 3/2016 | Hovor | G06F 21/55 726/23 |
| 2016/0072835 A1 | 3/2016 | Roytman et al. | |
| 2016/0072836 A1* | 3/2016 | Hadden | H04L 63/1441 726/23 |
| 2016/0088010 A1 | 3/2016 | Oliphant et al. | |
| 2016/0127395 A1* | 5/2016 | Underwood | H04L 63/1416 726/23 |
| 2016/0188880 A1* | 6/2016 | Smith | G06F 21/567 726/23 |
| 2016/0191548 A1 | 6/2016 | Smith | |
| 2016/0205122 A1 | 7/2016 | Bassett | |
| 2016/0217187 A1* | 7/2016 | Iesiev | G06F 17/30554 |
| 2016/0248795 A1 | 8/2016 | Chien | |
| 2016/0248813 A1 | 8/2016 | Byrnes | |

(56) References Cited

U.S. PATENT DOCUMENTS

| | | | |
|---|---|---|---|
| 2016/0269434 A1* | 9/2016 | DiValentin | H04L 63/1408 |
| 2016/0269447 A1 | 9/2016 | Kailash | |
| 2016/0306979 A1* | 10/2016 | Kotler | G06F 21/577 |
| 2016/0306980 A1* | 10/2016 | Kotler | G06F 21/577 |
| 2016/0323295 A1* | 11/2016 | Joram | G06F 21/566 |
| 2016/0359899 A1* | 12/2016 | Zandani | H04L 63/1433 |
| 2016/0366174 A1* | 12/2016 | Chernin | G06F 17/30312 |
| 2016/0378978 A1 | 12/2016 | Singla et al. | |
| 2016/0380977 A1* | 12/2016 | Bean | H04L 63/1408 726/12 |
| 2017/0006061 A1* | 1/2017 | Murphy | H04L 63/1441 |
| 2017/0142150 A1 | 5/2017 | Sandke | |
| 2017/0142154 A1 | 5/2017 | Hagar | |
| 2017/0201540 A1 | 7/2017 | Call | |
| 2017/0230389 A1 | 8/2017 | Cochenour | |

OTHER PUBLICATIONS

Non-Final Action dated Jun. 18, 2015 U.S. Appl. No. 14/190,051, filed Feb. 25, 2014, pp. 1-31.
Non-Final Action dated Aug. 28, 2015, U.S. Appl. No. 14/631,309, pp. 1-39.
Hu et al., "Large-Scale Malware Indexing Using Function-Call Graphs", Proceedings of the 16th ACM Conference on Computer Communications Security, Nov. 9-13, 2009, pp. 611-620.

\* cited by examiner

AUTOMATED INTELLIGENCE GRAPH CONSTRUCTION AND COUNTERMEASURE DEPLOYMENT

RELATED APPLICATION

This application is a continuation of U.S. patent application Ser. No. 14/190,051, filed Feb. 25, 2014 (now U.S. Pat. No. 9,886,581), which is incorporated herein by reference.

TECHNICAL FIELD

The techniques provided herein relate to information security threat assessment and amelioration.

SUMMARY

According to some implementations, a method is provided. The method includes obtaining fundamental data, obtaining document data, preparing fundamental instance nodes from the fundamental data, preparing document nodes from the document data, preparing edges between at least some of the nodes, storing the nodes and the edges in a manner that reflects a graph structure, and causing to be displayed at least a portion of a graph defined by at least one node and at least one edge.

Various optional features of the above implementations include the following. Each fundamental instance may include data describing one of: an IP address, a domain name, a uniform resource locator, a file system path, a software vulnerability, a software, a person's name, an account handle, an email address, a malware family, an attack campaign, an event, an organization, a network, a file, a country, a region, or an autonomous system number. Each document may include data describing one of: an intelligence report, a communication, an analysis, or a context. The preparing edges may include extracting at least one fundamental data string from a fundamental instance. The preparing edges may include selecting an appropriate set of one or more words. The method may include matching a sub-graph including at least one node and at least one edge to a pattern of a known attack. The matching may be performed upon the graph receiving an additional amount of nodes and edges. The matching may be performed periodically. The matching may include obtaining a description of a countermeasure to the known attack. The method may include automatically implementing the countermeasure.

According to various implementations, computer readable media are disclosed. The computer readable media include instructions which, when executed by a computer system including at least one electronic processor, cause the at least one electronic processor to: obtain fundamental data, obtain document data, prepare fundamental instance nodes from the fundamental data, prepare document nodes from the document data, prepare edges between at least some of the nodes, store the nodes and the edges in a manner that reflects a graph structure, and cause to be displayed at least a portion of a graph defined by at least one node and at least one edge.

Various optional features of the above implementations include the following. Each fundamental instance may include data describing one of: an IP address, a domain name, a uniform resource locator, a file system path, a software vulnerability, a software, a person's name, an account handle, an email address, a malware family, an attack campaign, an event, an organization, a network, a file, a country, a region, or an autonomous system number. Each document may include data describing one of: an intelligence report, a communication, an analysis, or a context. Preparing edges may include extracting at least one fundamental data string from a fundamental instance. Preparing edges may include selecting an appropriate set of one or more words. The instructions, when executed by the computer system including the at least one electronic processor, may further cause the at least one electronic processor to: match a sub-graph including of at least one node and at least one edge to a pattern of a known attack. The instructions, when executed by the computer system including the at least one electronic processor, may further cause the at least one electronic processor to: match a sub-graph including of at least one node and at least one edge to a pattern of a known attack upon the graph receiving an additional amount of nodes and edges. The instructions, when executed by the computer system including the at least one electronic processor, may further cause the at least one electronic processor to: match a sub-graph including of at least one node and at least one edge to a pattern of a known attack periodically. The instructions, when executed by the computer system including the at least one electronic processor, may further cause the at least one electronic processor to: match a sub-graph including of at least one node and at least one edge to a pattern of a known attack by obtaining a description of a countermeasure to the known attack. The instructions, when executed by the computer system including the at least one electronic processor, may further cause the at least one electronic processor to automatically implement the countermeasure.

DESCRIPTION OF DRAWINGS

The accompanying drawings, which are incorporated in and constitute a part of this specification, illustrate implementations of the described technology. In the figures.

DETAILED DESCRIPTION

Figure 1A:
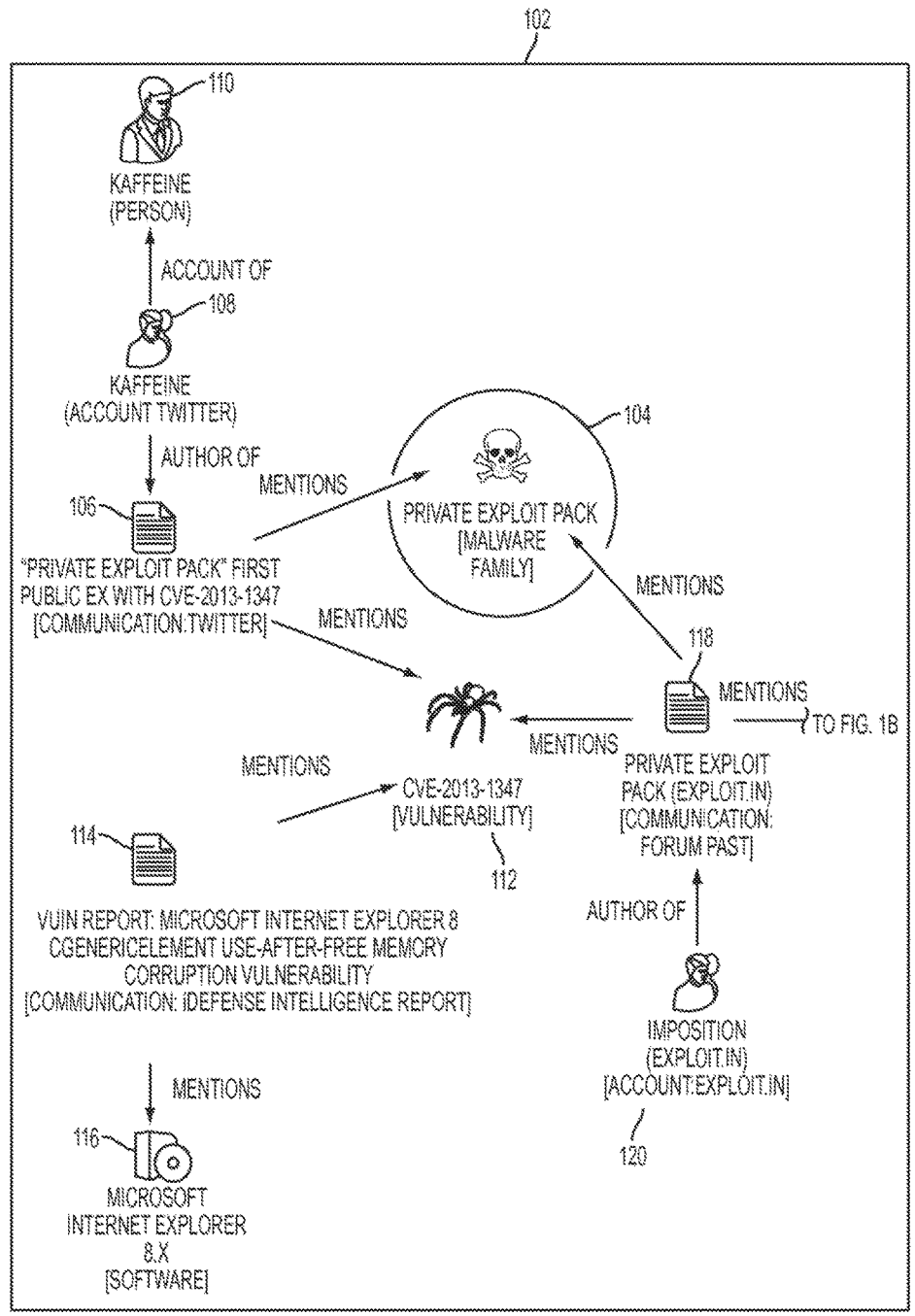
FIGS. 1A and 1B depict a portion of an intelligence graph according to some embodiments.

In what follows, Section I discloses techniques for automated intelligence graph construction and countermeasure deployment, and Section I discloses techniques for automated vulnerability intelligence generation and application. As described herein, some embodiments utilize intelligence graph data generated according to the techniques of Section I as part of the techniques of Section II.

Reference will now be made in detail to example implementations, which are illustrated in the accompanying drawings. Where possible the same reference numbers will be used throughout the drawings to refer to the same or like parts.

I. Intelligence Graph Construction and Countermeasure Deployment

The internet has a dark side that is littered with malware and frequented by malicious actors. In general, malware refers to any software that is capable of obtaining information from, or producing a function in, computers of others without their knowledge or without their consent. Malware often exploits known vulnerabilities in common software such as, for example, server programs. Malware can be conceptually grouped into malware families of like software. Further, malicious actors sometimes engage in attack campaigns, which may employ zero or more malware family instances, and which can coordinate multiple attacks toward a desired nefarious end. Malicious actors typically have various electronic presences, such as email addresses, other accounts (e.g., social media accounts), and websites. Malware operators may utilize a website, which can be defined according to uniform resource locator (URL) or internet protocol (IP) address, to operate, distribute, or market their malware.

Computer security analysts may take a simple topic or piece of information regarding, e.g., a specific piece of malware, and try to collect further information from many sources to provide context in an effort to assess a situation, provide insight into probable outcomes, or assess upcoming events. Analysts may improve the quality of their assessments and commentary by linking additional information to the analyst's initial point of research.

Techniques described in Section I link computer security data of diverse types and from very diverse sources together into an intelligence graph consisting of two types of nodes: simple fundamental data (e.g., "fundamental instances"), and other artifacts that describe those simple points and contribute to a larger contextual picture within which the simple data points lie (e.g., "document instances"). Thus, some embodiments provide implementations that permit analysts, systems, and tools to contribute graph nodes, what they know about the nodes, and other documents that describe the nodes, to a central database that can handle and process such interconnected data. Moreover, some embodiments generate intelligence graphs that, when displayed on a computer monitor, illustrate the interconnected data in a suggestive and informative manner. The intelligence graphs may be used to automatically identify attacks or other events, predict attacks or other events, and provide or suggest countermeasures thereto.

Figure 1B:
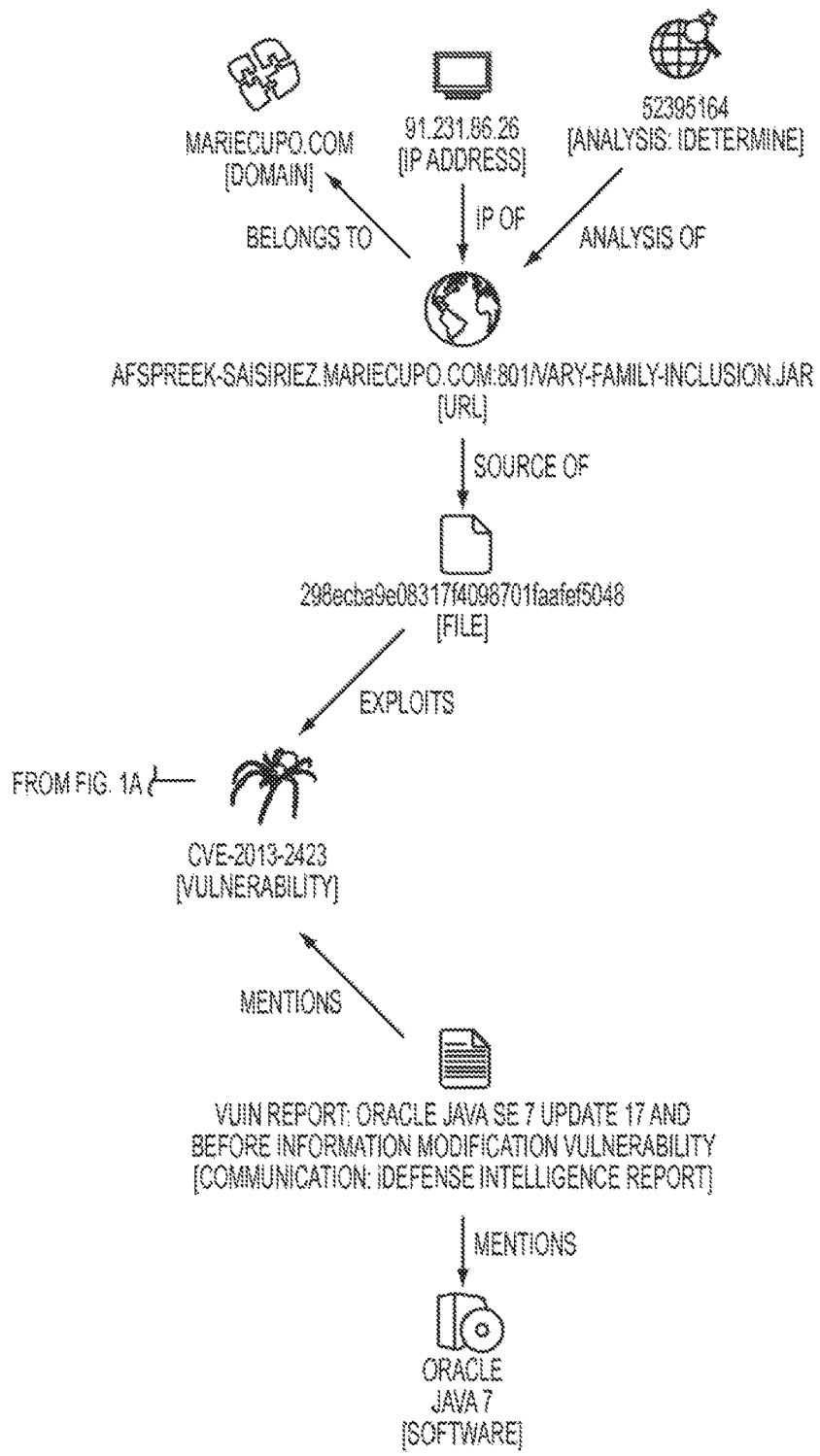

FIGS. 1A and 1B depict a portion of an intelligence graph according to some embodiments. The intelligence graph of FIGS. 1A and 1B may be generated and prepared for display according to some embodiments. Illustrated within the black rectangle 102 is a malware family fundamental instance 104 named "Private Exploit Pack". The malware family fundamental 104 is mentioned in both a tweet (represented by communication instance 106) and a forum post (represented by communication instance 118). The author of the tweet is a Twitter account (represented by account fundamental instance 108) belonging to a person. Both the forum post and the tweet mention a software vulnerability, represented by vulnerability fundamental instance 112, associated with common vulnerability and exposure number CVE-2013-1347. The software vulnerability is mentioned by an intelligence report, represented by communication instance 114, written by computer security company DEFENSE, a division of VERISIGN. The intelligence report links that vulnerability to a specific piece of software, represented by software fundamental instance 216. The graph extends on outside of rectangle 102 to further highlight the connected nature of the data.

Figure 2A:
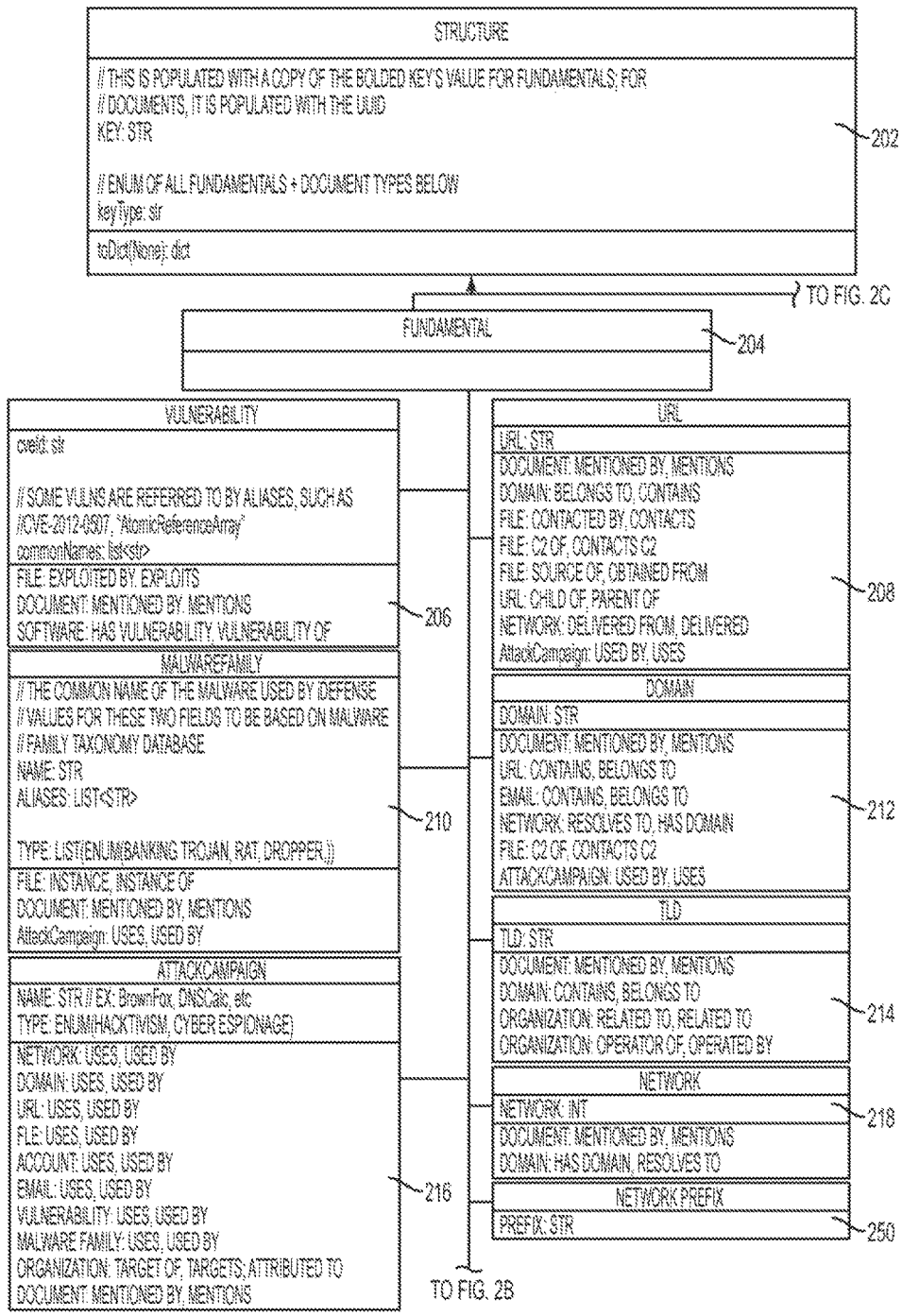
FIGS. 2A, 2B, and 2C depict a schematic diagram of data types according to some embodiments.
Figure 2B:
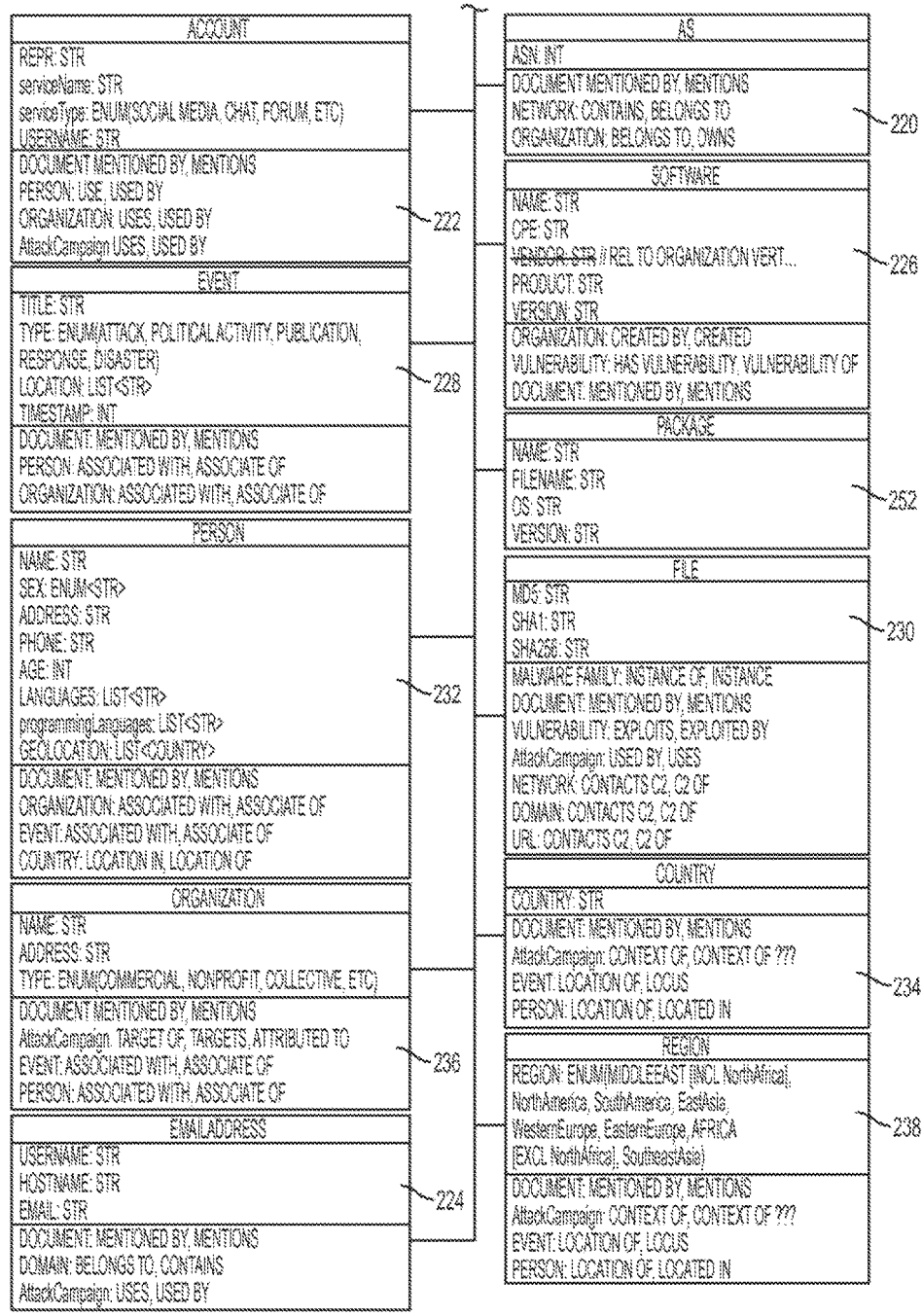
Figure 2C:
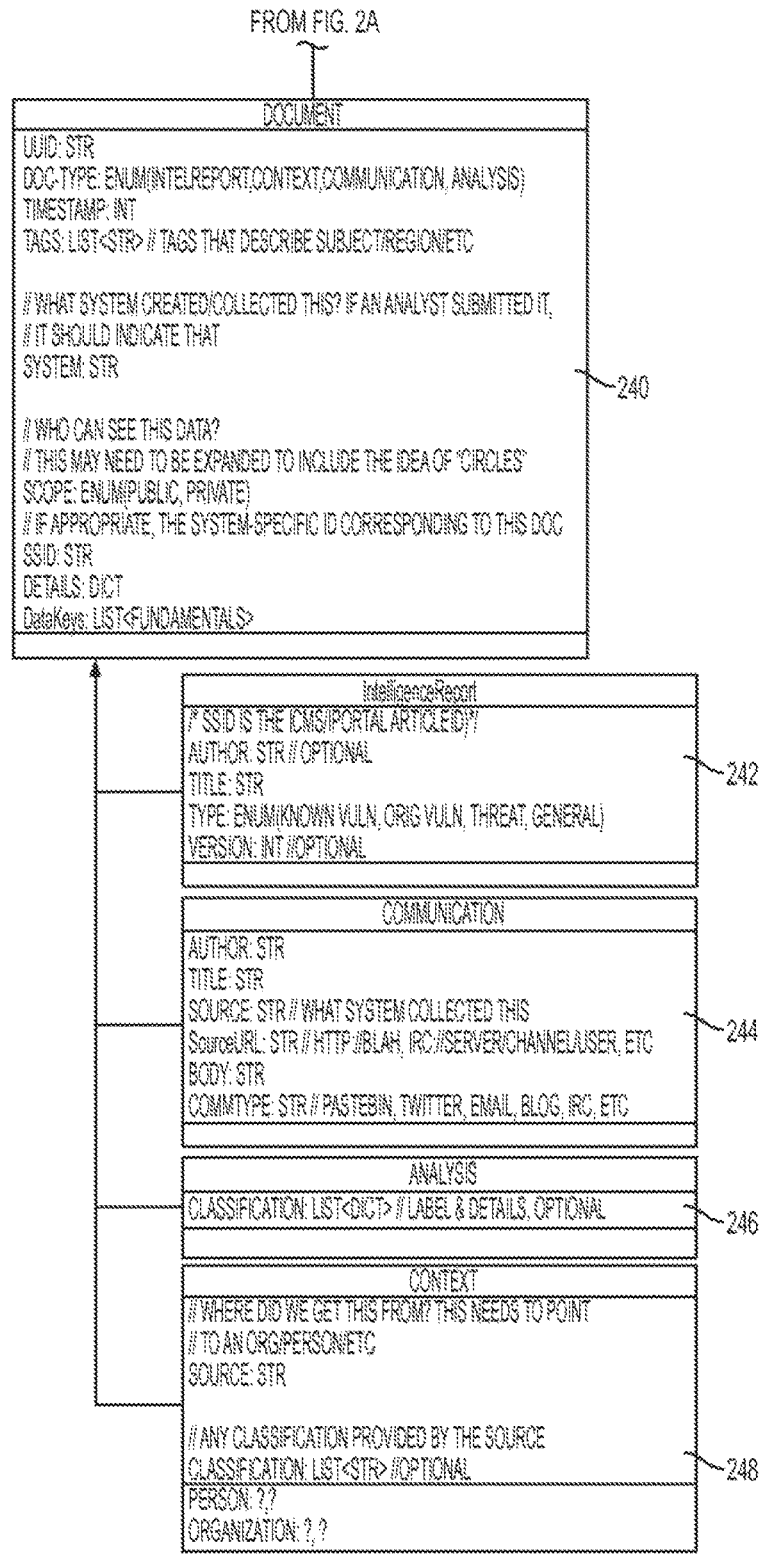

FIGS. 2A, 2B, and 2C depict a schematic diagram of data types according to some embodiments. Electronically-implemented instances of the data types depicted in FIGS. 2A, 2B, and 2C may be used as nodes in a graph as depicted in, e.g., FIGS. 1A and 1B. That is, an instance of each data type depicted in FIGS. 2A, 2B, and 2C may be computer-implemented as a stored data structure. As shown in the schematic diagram, each data type is characterized by one or more particular instances of identifying data, e.g., a string of characters ("str"). FIGS. 2A, 2B, and 2C are described in terms of a class hierarchy, with a generic data structure 202 at its base. In general, data types considered by some embodiments can be classified as either fundamentals 204 or documents 240.

Each data type depicted in FIGS. 2A, 2B, and 2C includes a list of words (or word combinations) that are applicable in characterizing a relationship of an instance of the data type to an instance of another data type. That is, each data type has an associated set of words that may be used to characterize edges between a node of that data type and a node of another, possibly different, data type. For example, an email fundamental instance may be related to a document instance by being "mentioned by" the document instance. Note that the sets of words illustrated in FIGS. 2A, 2B, and 2C are to be taken as non-limiting examples; more, fewer, or different sets of words, either characterizing the same relationships or characterizing other relationships, may be used instead.

In some embodiments, the edges between nodes may be directional. Thus, an edge may connect from an email fundamental instance to a document instance using the word combination "mentioned by", whereas an edge may connect from the document instance to the email fundamental instance using the word combination "mentions". The data types may thus include indicators of which word(s) to utilize in each direction in relation to another data type. In other embodiments, the edges are unidirectional, and only one word (or set of words) is associated with each pair of node types.

Fundamentals 204 generally include data types for items of primary concern to computer security analysts. Fundamentals include vulnerabilities 206, URLs 208, malware families 210, domains 212, top-level domains 214, attack campaigns 216, networks 218, autonomous system numbers 220, accounts 222, email addresses 224, software 226, events 228, files 230, persons 232, countries 234, organizations 236, and regions 238. Fundamentals are discussed in detail presently.

Each instance of a vulnerability fundamental 206 may be characterized by an identifying string, e.g., a Common Vulnerability and Exposure (CVE) identification, provided by the MITRE corporation. Each vulnerability fundamental 206 instance can be related to a file fundamental 230 instance by the words "exploits" or "is exploited by".

Each instance of a URL fundamental 208 may be characterized by a string, e.g., "http://www.example.com". Each URL fundamental 208 instance can be related to a document 240 instance by the words "mentions" or "mentioned by". Each URL fundamental 208 instance can be related to a domain fundamental 212 instance by the words "belongs to" or "contains". Each URL fundamental 208 instance can be related to a file fundamental 230 instance by the words "contains", "contacted by", "source of" or "obtained from". Each URL fundamental 208 instance can be related to another URL fundamental 208 instance by the words "is a child of" or "is a parent of". Each URL fundamental 208 instance can be related to a network fundamental 218 instance by the words "is delivered from" or "is delivered by". Each URL fundamental 208 instance can be related to an attack campaign fundamental 216 instance by the words "command and control of" or "command and control by". Each URL fundamental 208 instance can be related to a malware family fundamental 210 instance by the words "command and control of" or "command and control by". Each URL fundamental 208 instance can be related to a file fundamental 230 instance by the words "command and control of" or "command and control by".

Each instance of a malware family fundamental 210 may be characterized by a string depicting its name, as well as further optional strings depicting any aliases. Each malware family fundamental 210 instance can be related to a file fundamental 230 instance by the words "instance" or "instance of". Each malware family fundamental 210 instance can be related to a document 240 instance by the words "mentioned by" or "mentions". Each malware family 210 instance can be related to an attack campaign fundamental 216 instance by the words "uses" or "is used by". Each malware family 210 instance can be related to a domain fundamental 212 instance by the words "command and control of" or "command and control by". Each malware family fundamental 210 instance can be related to a URL fundamental 218 instance by the words "command and control of" or "command and control by".

Each instance of a domain fundamental 212 may be characterized by a string, e.g., "example.com". Each domain fundamental 212 instance can be related to a document 240 instance by the words "contains" or "belongs to". Each domain fundamental 212 instance can be related to an email address fundamental 224 instance by the words "contains" or "belongs to". Each domain fundamental 212 instance can be related to an network fundamental 218 instance by the words "resolves to" or "has domain". Each domain fundamental 212 instance can be related to an attack campaign fundamental 216 instance by the words "command and control of" or "command and control by". Each domain fundamental 212 instance can be related to a malware family fundamental 210 instance by the words "command and control of" or "command and control by". Each domain fundamental 212 instance can be related to a file fundamental 230 instance by the words "command and control of" or "command and control by".

Each instance of a top level domain (TLD) fundamental 214 may be characterized by a string, e.g., ".com". Each TLD fundamental 214 instance can be related to a document 240 instance by the words "mentions" or "mentioned by". Each TLD fundamental 214 instance can be related to a domain fundamental 212 instance by the words "contains" or "belongs to". Each TLD fundamental 214 instance can be related to an organization fundamental 236 instance by the words "related to", "operator of" or "operated by".

Each instance of an attack campaign fundamental 216 may be characterized by a string depicting its name, e.g., "BrownFox" as well as a string representing a type, e.g., "cyber espionage" or "hactivism". Each attack campaign fundamental 216 instance can be related to a network fundamental 218 instance by the words "uses" or "used by". Each attack campaign fundamental 216 instance can be related to a file fundamental 230 instance by the words "uses" or "used by". Each attack campaign fundamental 216 instance can be related to an account fundamental 222 instance by the words "uses" or "used by". Each attack campaign fundamental 216 instance can be related to an email address fundamental 224 instance by the words "uses" or "used by". Each attack campaign fundamental 216 instance can be related to a vulnerability fundamental 206 instance by the words "uses" or "used by". Each attack campaign fundamental 216 instance can be related to a malware family fundamental 210 instance by the words "uses" or "used by". Each attack campaign fundamental 216 instance can be related to an organization fundamental 236 instance by the words "targets", "target of" or "attributed to". Each attack campaign fundamental 216 instance can be related to a document 240 instance by the words "mentioned by" or "mentions". Each attack campaign fundamental 216 instance can be related to a domain fundamental 212 instance by the words "command and control of" or "command and control by". Each attack campaign fundamental 216 instance can be related to a URL fundamental 218 instance by the words "command and control of" or "command and control by".

Each instance of a network fundamental 218 may be characterized by a string or an integer representing an IP address, e.g., "2001:0db8:85a3:0042:1000:8a2e:0370:7334". Each network fundamental 218 instance can be related to a document 240 instance by the words "mentions" or "mentioned by". Each network fundamental 218 instance can be related to a domain fundamental 212 instance by the words "has domain" or "resolves to".

Each instance of an autonomous system (AS) fundamental 220 may be characterized by an autonomous system number, e.g., an ASN as provided by ARIN. Each autonomous system fundamental 220 instance can be related to a document 240 instance by the words "mentions" or "is mentioned by". Each autonomous system fundamental 220 instance can be related to a network fundamental 218 instance by the words "contains" or "belongs to". Each autonomous system fundamental 220 instance can be related to an organization fundamental 236 instance by the words "belongs to" or "owns".

Each instance of an account fundamental 222 may be characterized by a string representing the account, e.g., "jon.smith@twitter", a string representing a service name, e.g., "twitter", a string representing a service type, e.g., "social media", "chat", "forum", etc., and a string representing a user name, e.g., "Jon Smith". Each account fundamental 222 instance can be related to a document 240 instance by the words "mentions" or "is mentioned by". Each account fundamental 222 instance can be related to a person fundamental 232 instance by the words "uses" or "is used by". Each account fundamental 222 instance can be related to an organization fundamental 236 instance by the words "uses" or "is used by". Each account fundamental 222 instance can be related to an attack campaign 216 instance by the words ""uses" or "is used by".

Each instance of an email address fundamental 224 may be characterized by a string representing a user name, e.g., "Jon Smith", a string representing a host name, e.g., "imap.example.com", and a string representing an email address, e.g., "jon.smith@imap.example.com". Each email address fundamental 224 instance can be related to a document 240 instance by the words "mentions" or "is mentioned by". Each email address fundamental 224 instance can be related to a domain fundamental 212 instance by the words "belongs to" or "contains". Each email address fundamental 224 instance can be related to an attack campaign 216 instance by the words "uses" or "is used by".

Each instance of a software fundamental 226 may be characterized by a string representing a name, e.g., "OFFICE", a string representing a common platform enumeration provided by MITRE corporation (CPE), e.g., "cpe:/o:freebsd:freebsd:3.5.1", a string representing a product, e.g., "WORD", and a string representing a version, e.g., "v2.1.1". Each software fundamental 226 instance can be related to an organization fundamental 236 instance by the words "created by" or "created". Each software fundamental 226 instance can be related to a vulnerability fundamental 206 instance by the words "has vulnerability" or "vulnerability of". Each software fundamental 226 instance can be related to a document 240 instance by the words "mentions" or "is mentioned by".

Each instance of an event fundamental 228 may be characterized by a string representing a title, e.g., "Asiana Flight 214 Crash", a string representing a type, e.g., "attack", "political activity", "publication", "response" or "disaster", a string representing a location, e.g., "San Francisco, Calif., USA", and a timestamp, e.g., "04:57:07.2 UTC (d31.01.99)". Each event fundamental 228 instance can be related to a document 240 instance by the words "mentions" or "is mentioned by". Each event fundamental 228 instance can be related to a person fundamental 232 instance by the words "associated with" or "associate of". Each event fundamental 228 instance can be related to an organization fundamental 236 instance by the words "associated with" or "associate of".

Each instance of a file fundamental 230 may be characterized by a set of strings representing hashes, e.g., an MD5 hash, a SHA-1 hash, and a SHA-256 hash. Each file fundamental 230 instance can be related to a malware family fundamental 210 instance by the words "instance of" or "instance". Each file fundamental 230 instance can be related to a document 240 instance by the words "mentioned by" or "mentions". Each file fundamental 230 instance can be related to a vulnerability fundamental 206 instance by the words "exploits" or "is exploited by". Each file fundamental 230 instance can be related to a domain fundamental 212 instance by the words "command and control of" or "command and control by". Each file fundamental 230 instance can be related to a URL fundamental 218 instance by the words "command and control of" or "command and control by".

Each instance of a person fundamental 232 may be characterized by a string representing a name, e.g., "Jon Smith", and other optional attributes, such as a string representing a sex, e.g., "M" or "F", a string representing an address, a string representing a phone number, an integer representing an age, a string representing a spoken language, one or more strings representing programming languages with which the person is familiar, and a string representing a geolocation. Each person fundamental 232 instance can be related to a document 240 instance by the words "mentions" or "is mentioned by". Each person fundamental 232 instance can be related to an organization fundamental 236 instance by the words "associated with" or "associate of". Each person fundamental 232 instance can be related to an event fundamental 228 instance by the words "associated with" or "associate of". Each person fundamental 232 instance can be related to a country fundamental 234 instance by the words "located in" or "location of".

Each instance of a country fundamental 234 may be characterized by a string representing the country name, e.g., "USA". Each country fundamental 234 instance can be related to a document 240 instance by the words "mentions" or "is mentioned by". Each country fundamental 234 instance can be related to an attack campaign fundamental 216 instance by the words "context of". Each country fundamental 234 instance can be related to an event fundamental 228 instance by the words "location of" or "locus". Each country fundamental 234 instance can be related to a person fundamental 232 instance by the words "location of" or "located in".

Each instance of an organization fundamental 236 may be characterized by a string representing the organization's name, e.g., "verisign", a string representing an address, and a string representing a type, e.g., "commercial", "nonprofit", "collective", etc. Each organization fundamental 236 instance can be related to a document 240 instance by the words "mentions" or "mentioned by". Each organization fundamental 236 instance can be related to an attack campaign fundamental 216 instance by the words "targets", "target of", or "attributed to". Each organization fundamental 236 instance can be related to an event fundamental 228 instance by the words "associated with" or "associate of". Each organization fundamental 236 instance can be related to a person fundamental 232 instance by the words "associated with" or "associate of".

Each instance of an region fundamental 238 may be characterized by a string, e.g., "middle east", "north america", "south america", "east asia", "western europe", "eastern europe", "africa", or "southeast asia". Each region fundamental 238 instance can be related to a document 240 instance by the words "mentioned by" or "mentions". Each region fundamental 238 instance can be related to an attack campaign 216 instance by the words "context of". Each region fundamental 238 instance can be related to an event fundamental 228 instance by the words "location of" or "locus". Each region fundamental 238 instance can be related to a person fundamental 232 instance by the words "location of" or "location".

Each instance of network prefix fundamental 250 may be characterized by a string representing the network prefix, e.g., 192.168.1.0/24.

Each instance of a package fundamental 252 may be characterized by a string representing the package name, e.g., "Word", a string representing a file name, e.g., "word.exe", a string representing an operating system, e.g., "OSX", and a string representing a version, e.g., "v.1.1". Note that the terms "package" and "software package" are used interchangeably herein.

Documents 240 generally include data types for items of secondary concern to computer security analysts. Each instance of a document 240 may be characterized by a string representing a universal unique identifier (UUID), a string representing a document type, e.g., "intelligence report", "context", "communication", or "analysis", an integer representing a timestamp, and one or more tags, e.g., strings that describe the subject matter of the document 240 instance, region, etc. Each document 240 instance can be further characterized by a string indicating the system that created or collected it. Each document 240 instance can be further characterized by a string indicating the document's privacy, e.g., "public", "private", etc. Each document 240 instance can be further characterized by one or more data indicating the system corresponding to the document 240 instance, e.g., a system-specific identification (SSID) and one or more data keys representing associated fundamentals 206-238. Each document 240 instance can be further characterized by its content as input into a details field. Types of documents 240 include intelligence reports 242, communications 244, analyses 246, and contexts 248.

Each instance of an intelligence report document 242 may be characterized by a string representing the title, a string representing the author, a type, e.g., known vulnerability, original vulnerability, threat, etc., and an integer representing a version.

Each instance of a communication document 244 may be characterized by a string representing the title, a string representing the author, a string representing a source, e.g., who or what system collected the document, a string representing the body of the communication, e.g., the entire body of the communication, and a communication type, e.g., pastebin, twitter, email, blog, internet relay chat (IRC), etc.

Each instance of an analysis document 246 may be characterized by a classification, which can include a label and various details.

Each instance of a context document 248 may be characterized by a string representing a source of the document, as well as an indication of an associated person fundamental 232 and organization fundamental 236. Note that the blocks illustrated by and explained in the context of FIG. 3 may be performed in essentially any order that is possible in view of requirements for obtaining information prior to processing it. Thus, for example, block 306, "obtain document data", may be performed between block 302, "obtain fundamental data" and block 304, "prepare fundamentals", instead of after block 304, as illustrated in FIG. 3.

Figure 3:
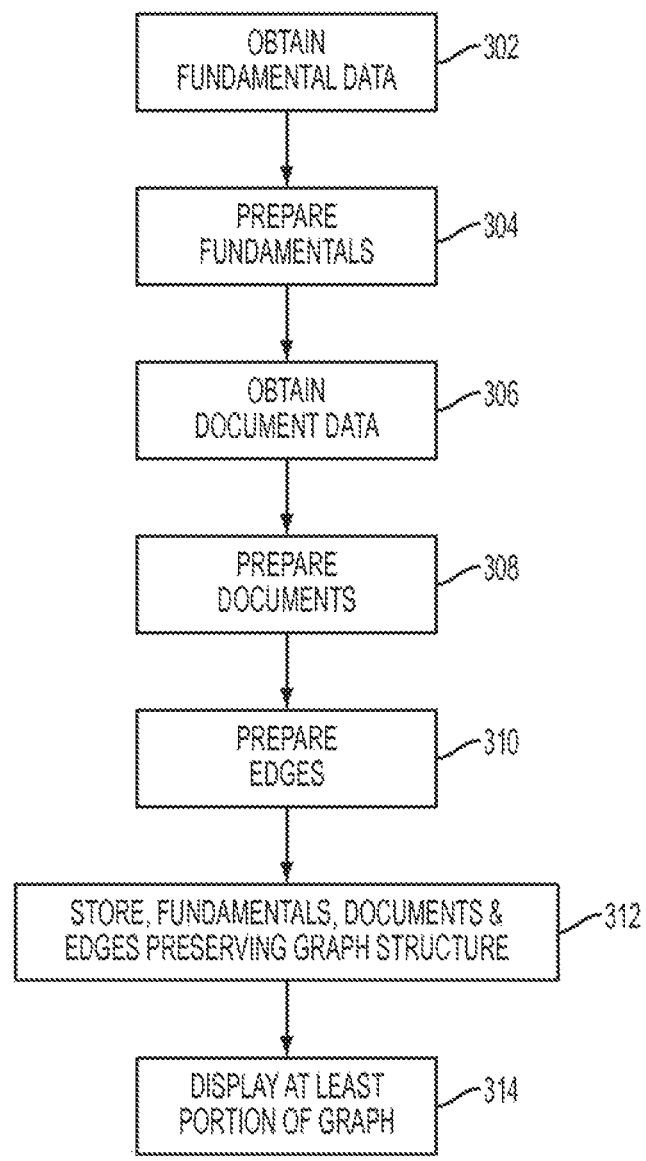
FIG. 3 is a flowchart illustrating a method of intelligence graph generation according to some embodiments.

FIG. 3 is a flowchart illustrating a method of intelligence graph generation according to some embodiments. The method may be practiced by, for example, a computer as implemented by a computer security company.

At block 302, the method obtains fundamental data. The fundamental data may be obtained from, e.g., public sources, private sources, and internal sources, i.e., sources internal to a computer security company. Data from these sources ranges from, for example, binary data (malware samples), to news articles and blog posts authored by people, to structured XML report data generated by an analysis system. The techniques of collection can be varied. For example, an embodiment may automatically scrape a website for an article, or the article may be available via a feed, such as an RSS/Atom feed.

Public data sources include anything one may access without a paid account or special relationship or partnership with another person or group. Examples of public sources and their fundamental data follow. News websites, public mailing lists and social media accounts can host or present content such as news articles, editorials, blogs, and status updates, any of which can include fundamental data reflecting people's names, email addresses, URLs, and events. Internet relay chat accounts can include discussion and commentary, which can include fundamental data such as people's names, account handles, URLs, and events. Security websites can include aggregations off threat data, blog posts, and reports, any of which can include fundamental data such as events, people's names, email addresses, account handles, URLs, IP addresses, malicious software names, vulnerability identifiers, and attack campaign information. Free malware sandboxing services can include reports on malware behavior, which can include fundamental data such as malware classifications, IP addresses, URLs, domain names, system behavior data, file hashes, and malicious software names.

Private sources are organizations that collect data and make it available for a fee or through trade. Examples of private sources and their fundamental data include articles, blog posts, commentary, malware samples, malicious URLs, and other network indicators. Any of these content types can include fundamental data such as author names, email addresses, URLs, IP addresses, domain names, events, malicious software names, vulnerability identifiers, attack campaigns, and malware samples. Malware sample providers can provide malware samples, malicious URLs, and other network indicators. These types of content can include fundamental data such as URLs, IP addresses, domain names, malicious software names, and malware samples.

At block 304, the method prepares fundamentals. In particular, the method takes the data collected at block 302 and prepares and stores data structures representing fundamental instances therefrom. The data structures described in reference to FIGS. 2A, 2B, and 2C may be utilized. Note that, in contrast to documents, fundamentals may generally be represented by a few short strings of characters. In general, the process may be performed using known parsing techniques. That is, the fundamental instances may be prepared using automated parsing techniques applied to the data collected at block 304. Some embodiments may also permit known manual parsing and data formation techniques.

Automating data correlation, e.g., converting raw data into formatted fundamental instances, generally includes recognizing fundamental data within other data. Techniques can identify the presence of an IP address in a document body in a few different ways; an example approach is to use a regular expression to identify the octet form. A similar approach may be used to identify CVE identifications representing a vulnerability, domain names, URLs, file hashes, and so on. Known applications do this to in order to transform URLs or email addresses into hyperlinks a user can click on to open in a browser or email client, respectively. Another approach incorporates approaches similar to those just described together with natural language processing techniques to extract fundamentals into software. The software takes text as a parameter and returns a list of pairs; each pair consists of the fundamental, and the type of fundamental. Suitable software includes, for example, OPENCALAIS, available from THOMPSON REUTERS of New York, N.Y., USA, or ALCHEMY CATALYST, available from ALCHEMY SOFTWARE of Dublin, Ireland.

In some cases, systems that produce the fundamental data are also well-suited to identifying fundamentals. For example, a system that analyzes network traffic might be capable of extracting IP addresses, domain names, and other network based indicators from the traffic it is analyzing. Other systems may be able to analyze a file and conclude that its contents exploit a particular vulnerability. In general, there are many public sources that make data available in structured formats that identify many fundamentals and imply relationships between them.

Computer security companies can utilize tools and systems that ingest data collected from public and private sources and produce derivative data. For example, such companies can execute a malicious executable within an instrumented virtual machine that is set to capture and analyze network traffic, and the executable may try to contact a remote server over a network identified by an domain name. The domain name and any IP address the domain name resolved to may be new data derived from the malicious executable. Techniques disclosed in U.S. patent application Ser. No. 13/219,208 entitled, "Method and System for Automatic Detection and Analysis of Malware" can be adapted to gather information in this manner. As another example, an instrumented sandbox or analysis system can ingest URLs, executables, PDFs, MICROSOFT OFFICE documents, and other data, and output fundamental data such as URLs, domain names, IP addresses, executables, configuration files, MICROSOFT OFFICE documents, PDFs (represented as file fundamentals), malicious software names, and vulnerability identifiers. Techniques disclosed in U.S. patent application Ser. No. 12/982,508 entitled, "Systems and Methods for Malware Detection and Scanning" can be adapted to that end. As another example, static analysis tools can ingest executables and output fundamental data such as packer information, malicious software names, executables, imported function names, and exported function names. U.S. patent application Ser. No. 13/572,185 entitled, "White Listing DNS Top-Talkers" discloses techniques that can be adapted for this purpose. A "packer" here is a program that packages other programs, e.g., for deployment. In general, a packer reduces file size and is used to help evade anti-virus or other static analysis, detection of the underlying executable, etc. Packers can generally be used for legitimate and malicious purposes.

At block 306, the method obtains document data, including intelligence report, communication, context, and analysis document data. Like fundamental data, document data may be obtained from, e.g., public sources, private sources, and internal sources, i.e., sources internal to a computer security company. Data from these sources includes, for example, news articles, blog posts, and structured XML report data generated by an analysis system. The techniques of collection can be varied. For example, an embodiment may automatically scrape a website for an article, or the article may be available via a feed, such as an RSS/Atom feed.

Intelligence report data may be obtained from the analysts that prepared them. In particular, analysts may produce MALTEGO mtgx or MICROSOFT EXCEL files, that include fundamental data such as URLs, domain names, IP addresses, files, people's names, accounts, and other fundamental data.

Communication document data may be obtained by a known collection facility concentrating on gathering news articles, blog posts, logging chat messages in public chat rooms, social media interactions, and the like. Communications documents in general reflect various types of communications.

Context document data may be obtained by or from an analyst. Context documents are relatively simple structures that record where information came from, and how sensitive that data (and any derivative data) may be. Thus, context documents generally describe a fundamental, where an analyst learned about it, any information the source was able to provide about the fundamental (e.g., whether it was associated with malicious behavior), the date the analyst learned about the data, and so on. For example, context documents may include information about when an analyst first learned about an event from a particular blog post or tweet so a timeliness may be attributed to them, and potentially used in future analytical approaches living on top of an interconnected graph according to some embodiments. As another example, context documents may include information about document sensitivity in order to track who can and cannot see information related to that file, and propagate that scoping information to any derived data points.

Analysis document data is generally produced by systems or people that have analyzed one or more fundamentals. Analysis documents may record a structured set of observations, notes, derivative data, or conclusions. They may also include structures that describe relationships between the subject fundamental(s) and other fundamentals. An example of an analysis document begins with an intelligence report, for example, produced by an automated sandboxing system used to analyze a URL by observing the behavior of a virtual machine while the URL is visited by a browser running in the virtual machine. The report may contain information about IP addresses contacted, domains looked up, files downloaded from remote servers, and the like. Further, analysis document data may include mitigation information in a format amenable to automated parsing.

Analysis documents may facilitate creation of the graph structure, such as relationships, what fundamental was the subject of the analysis, what system did the analysis, when the analysis occurred, and the like. It may also define a placeholder to record other observations, notes, and conclusions present in the original report such that it can be stored within the graph and made available to users without going back to the original report, or some system specific database.

At block 308, the method prepares documents, including intelligence reports, communication documents, context documents, and analysis documents. In particular, the method takes the data collected at block 304 and prepares and stores data structures representing document instances therefrom. The data structures described in reference to FIGS. 2A, 2B, and 2C may be utilized. In general, the process may be performed using known parsing techniques. Document instances may be prepared using automated parsing techniques applied to the data collected at block 304. Some embodiments may also permit known manual parsing and data formation techniques.

Intelligence report documents may be automatically generated from the output of the intelligence gathering tools. Because the output structure of the discussed example analysis systems may be static, a technician can translate it into an intelligence report that formally describes the relationships between the original URL that was sandboxed and any other fundamental that was described in the report. Alternately, or in addition, known parsing techniques can be used to convert intelligence report data into intelligence report documents.

Known parsing techniques can be used to generate communication documents. A communication document schema generally includes the common fields that apply to any kind of communication, e.g., author, title/subject, body, account, the service the communication was on or over, the type of communication, etc., as well as a structure to formally document relationships between fundamentals and the communication itself.

Known parsing techniques can be used to generate context documents from the data gathered at block 308. For example, context documents may be prepared from analysis document data.

Regarding analysis documents, a detailed discussion of preparing analysis documents from collected data is presented below in reference to FIG. 4.

At block 310, the method prepares the edges of the graph. Nodes of the graph are fundamental instances prepared at block 304 and documents prepared at block 308. Edges are electronically stored links between nodes and are associated with words describing the relationship between the connected nodes.

In general, data representing each edge may include edge metadata. For example, each edge may include a timestamp representing a time at which the relationship appeared. Thus, data representing an edge may include a timestamp of when the relationship first came into being, e.g., when a domain first resolved to a network. Note that such a timestamp is for the time of the event, e.g., time of the resolution, rather than for the time the edge is added to the graph. Other stored edge metadata can include, by way of non-limiting example, an identification of the system or source that provided the information reflected by the edge, e.g., for audit and removal purposes, an identification of the scope of the relationship, an identification of edge privacy, e.g., public/private/confidential, list of who can see it, etc.

As discussed herein, edges may be directional and may be represented graphically by an arrow to designate the direction. When fundamentals are identified, the type of relationship between the data and the fundamental depends on the fundamental and the type of data where the fundamental was identified. For example, a blog post may discuss a person, and it is possible to create a relationship between the blog post and the person because the blog mentions the person. Reports, blogs, and news articles are examples of types of data that dictate what the relationship is, and do not necessarily take into account the fundamental. However, there are cases where the fundamental dictates the type relationship, such as the vulnerability fundamental. For example, a file may be found to exploit a vulnerability in software, and it might not matter whether it is a file or some other fundamental that is exploiting a vulnerability. The relationship types may be defined such that the source of the relationship is taken into account after the destination fundamental. Analysis and communication documents are primary conduits for communicating these relationships. The methods by which systems or people identify the relationships depend on the functionality and capabilities of the systems or people, as discussed herein.

At block 312, the method stores documents, fundamental instances, and edges, preserving the graph structure. Once fundamentals and their relationships to other fundamentals or documents are identified in the previous blocks, they can be electronically stored in persistent memory so as to preserve a graph structure. The nodes of the graph are the fundamental instances and documents (context, analysis, communication, intelligence reports), while the edges of the graph are the relationships identified by systems, people, and entity extraction techniques. Any specialized graph database could be used, such as Neo4j, available from NEO TECHNOLOGY of San Mateo, Calif., USA, or a more general database solution could be leveraged, such as relational database management system (RDBMS) like MySQL, available from Oracle Corporation of Redwood Shores, Calif., USA. In the latter approach, one table may hold nodes, while another table holds edges, with foreign key constraint on the two relevant rows in the nodes table.

At block 314, the method displays at least a portion of the graph. The display may include icons for nodes and arrows for edges as depicted in FIGS. 1A and 1B. The method may display a graph portion upon a user's command, for example. The graph portion may be selected to include one or more specific known nodes, e.g., a vulnerability fundamental instance with a specified common vulnerability and exposure number. To that end, an embodiment may include a user interface, which allows a user to search for graph portions that include information provided by a user in a query. The query may specify a particular node as well all nodes removed from the specified node by at most two edges (possibly with intermediate nodes). Thus, for this example the query may be of the form: "(node=vulnerability & CVE=2013-1347) & nodesout(2)". The query may specify that all nodes of a particular type, such as vulnerabilities, be displayed, along with all nodes connected thereto by at most one edge, e.g., "node=vulnerability & nodesout(1)".

Figure 4:
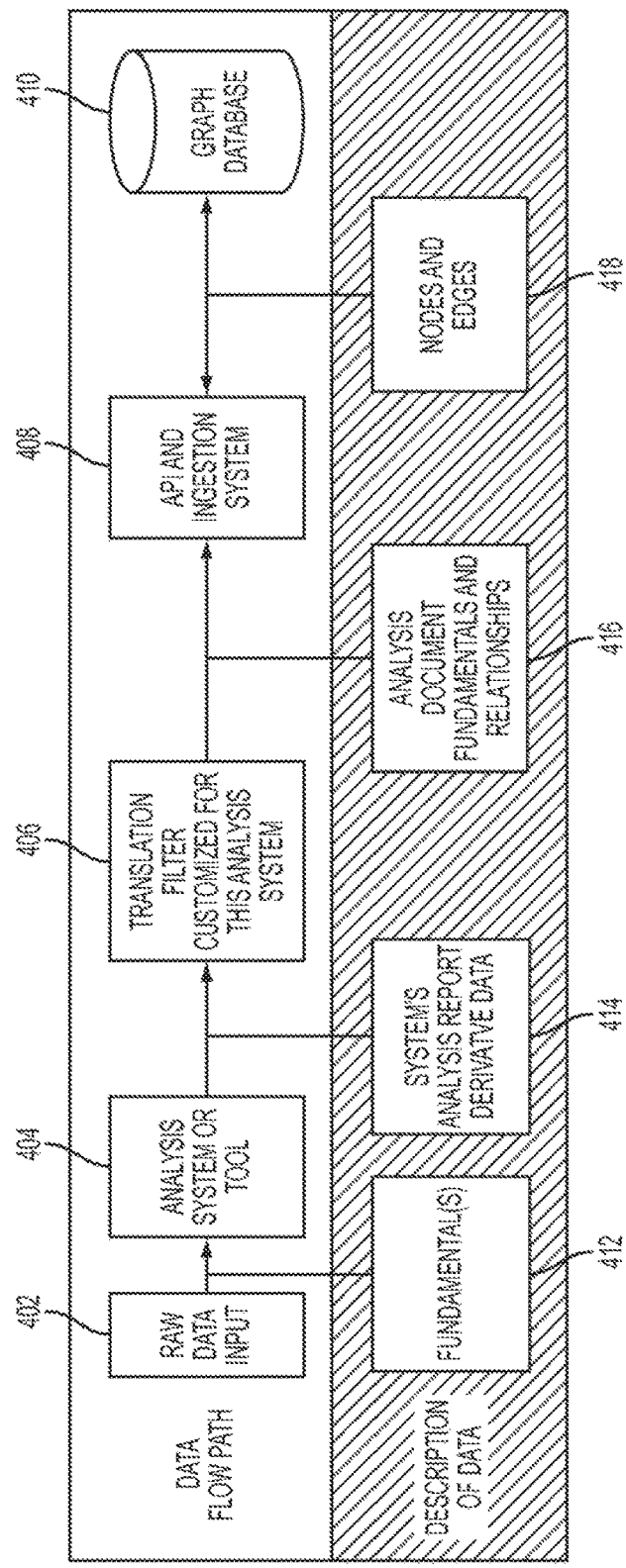
FIG. 4 is a schematic diagram of a translation architecture according to some embodiments.

FIG. 4 is a schematic diagram of a translation architecture according to some embodiments. FIG. 4 thus depicts how raw data 402 enters into an analysis system and becomes a set of nodes and edges (relationships) in the graph database 410. In particular, raw data 402 including fundamental data 412 may enter the system at an analysis system or tool 404, which creates an analysis report 414 from the derivative data.

Example analysis systems and tools 404 include the following. U.S. patent application Ser. No. 13/572,185 filed Aug. 10, 2012 and entitled, "White Listing DNS Top-Talkers" discloses techniques that can be adapted to input a file of any kind, extract metadata (e.g., author, etc.) without executing the file, and output the extracted metadata. U.S. patent application Ser. No. 13/219,208 entitled, "Method and System for Automatic Detection and Analysis of Malware" discloses techniques that can be adapted to input files in, e.g., PDF and DLL formats, determine what URLs the files contact when executed in a sandbox environment, and output the URLs. U.S. patent application Ser. No. 12/982,508 entitled, "Systems and Methods for Malware Detection and Scanning" can input a URL and output a corresponding IP address as well as a determination of whether the URL is associated with malware. The examples presented in this paragraph are to be taken as non-limiting Next, translation filter 406 processes the analysis report 414. Identifying fundamentals, creating coherent relationships, and generating nodes for the graph based on output from independent analysis systems and analyst tools may be referred to collectively as "translation." Each analysis approach may have its own unique form of output, refer to different kinds of data, and serve a unique purpose. In this regard, some embodiments utilize a different translation filter 406 for each system and analyst tool to adapt the respective output data for contribution to the graph. Each filter generally produces a document (analysis, context, communication, intelligence report); in this case, analysis document 416 is the product of translation.

The requirements for translation filter 406 are not extensive. Since the analysis document fundamental allows an incredible amount of expression via the details field (or subdocument), only the following two fields may remain to be identified. First, translation filter 406 may identify the data (identified by fundamental) that was analyzed. Second, the translation filter may identify any other fundamentals identified in the analysis output. If the answer to the second question is affirmative, then these data may be transformed into relationships between the analyzed fundamental and the derivative fundamentals.

Translation filter 406 may determine the other fields of analysis document fundamentals by constants or on the fly, e.g., based on the system that performed the analysis and the time and date that the analysis was performed. This latter parameter may be determined at the time of filtering because filtering may occur immediately after analysis. Alternately, it may be gleaned from the analysis report itself. In this way, any analysis system or tool 404 can contribute to a central graph of connected data without manual intervention.

Translation filter 406 thus produces fundamental instances and relations in analysis document 416 from the fundamental data in the analysis report 414. Next, application program interface (API) and ingestion system 408 processes the fundamental instances and relations into nodes and edges 418 stored in a graph database 410.

Figure 5:
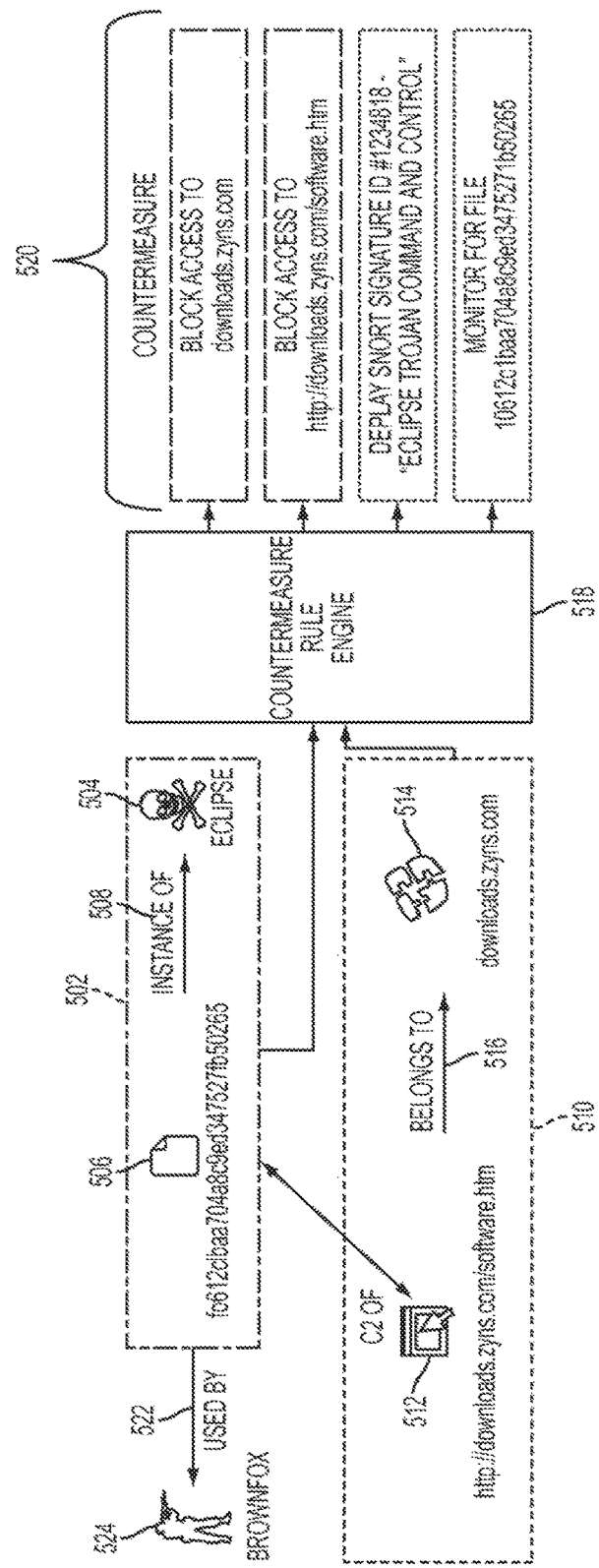
FIG. 5 is an intelligence graph detail illustrating specific events amenable to countermeasure deployment according to some embodiments.

FIG. 5 is an intelligence graph detail illustrating specific events amenable to countermeasure deployment according to some embodiments. In general, fundamentals and their relationships in a graph can describe a specific event or attack. Some embodiments utilize a set of rules to automatically suggest or implement countermeasures based on identifying a particular sub-graph describing the event or attack. As described herein, a "sub-graph" is a portion of a graph that includes at least one node and at least one edge. Sub-graphs representing attacks can consist of, for example, a specific type of fundamental joined to a specific type of edge, or two specific types of fundamentals joined by a specific type of edge.

In FIG. 5, for example, the sub-graphs contained within rectangles 502 and 510 represent attacks. FIG. 5 thus shows data on an attack that involves a malware sample 506. The sample 506, a file, is denoted by the string "f0612c1baa704a8c9ed347527fb50265" which is an instance 508 of the "eclipse" 504 backdoor Trojan that is used by 522 the "brownfox" 524 attack campaign. The sample 516 uses the URL "http://downloads.zyns.com/software.htm" 512 as a command and control server, which is hosted 516 on domain "downloads.zyns.com" 514.

Countermeasure rule engine 518 contains a set of rules that define countermeasures (e.g., 520) based on the types of fundamentals and relationships in the graph, i.e., as specific sub-graphs. The rules contain a set of conditions that, when met in the graph, indicate an attack or event amenable to a countermeasure. The rule may, in some embodiments, include the countermeasure itself. The rules may include templates, each indicating a sub-graph amenable to a countermeasure. Matching templates to sub-graphs may be performed as disclosed in U.S. Pat. No. 8,650,170 entitled, "Systems and Methods for Inter-Object Pattern Matching".

An example rule may state that if a malware sample (file fundamental instance node) uses a URL (url fundamental instance node) as a command and control server ("c2 of" edge label), a responsive countermeasure can include "block access to the URL and/or any related domain nodes". The rules can also specify tool-specific countermeasures, such as deploying a SNORT IDS signature that detects the traffic related to the Eclipse Trojan. (SNORT is provided by SOURCEFIRE of Columbia, Md., USA.) An embodiment can automatically deploy the countermeasure, or identify and provide the countermeasure to a user. Countermeasure rule engine 518 thus allows a small number of experts to create general rules that can be translated into specific countermeasures without knowing the specifics of each attack.

Countermeasure rule engine 518 may obtain the rules by iterating through each vulnerability node of an intelligence graph and determining, for each vulnerability node, whether documents such as intelligence reports mention it by examining the edges joined to the vulnerability node for the presence of "mentions" or "mentioned by" edges. If so, the iteration may parse the documents to extract any existing rules, including both sub-graph templates for matching to threats, and countermeasure templates. The extracted information may then be stored in countermeasure rules engine 518.

Figure 6:
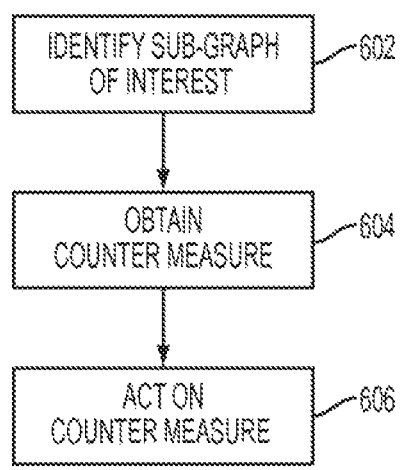
FIG. 6 is a flowchart illustrating a method of countermeasure deployment according to some embodiments.

FIG. 6 is a flowchart illustrating a method of countermeasure deployment according to some embodiments. The method of FIG. 6 may start by obtaining a graph produced according to embodiments disclosed herein. The method of FIG. 6 may be implemented by the same computer or a different computer from the one that generated the graph.

At block 602, the method identifies a sub-graph of interest. The identification may be made during a scheduled periodic complete or partial graph traversal, or during a user-initiated complete or partial graph traversal, for example. A complete or partial graph traversal may alternately, or in addition, be triggered upon a certain amount of data being added to the graph. In the latter case, the traversal may be partial but include the new data added to the graph. In some embodiments, traversing a graph may start from specific nodes or node types representing malicious activity. Some embodiments also inspect time data of the nodes and edges of an identified sub-graph. Such embodiments may only implement or suggest countermeasures if the time data is within a fixed interval (e.g., within 24 hours, within 12 hours, within 6 hours, within 1 hour, etc.) of the current time. Suitable software for performing the graph traversal includes REXTER, available from TINKERPOP online, in combination with FAUNUS graph analytics engine, available from AURELIUS online. Suitable techniques for matching rules to sub-graphs during the traversal are disclosed in U.S. Pat. No. 8,650,170 entitled, "Systems and Methods for Inter-Object Pattern Matching".

At block 604, the method obtains a countermeasure corresponding to the sub-graph identified at block 602. In embodiments that store countermeasures in the same templates used to identify the sub-graph to which the countermeasure corresponds, the method may so obtain the countermeasures therefrom. In other embodiments, the method may obtain countermeasures from a different storage source.

At block 606, the method acts on the countermeasure. This action may take different forms. Some embodiments, for example, present the countermeasure(s) to a user, e.g., by causing them to be displayed on a computer monitor. In such embodiments, the user may be able to select a specific embodiment, e.g., by clicking on it. That is, selecting a specific countermeasure may activate that countermeasure. Other embodiments may proceed to automatically implement the countermeasure(s), e.g., if the attack is within a certain fixed time interval of the current time.

Figure 7:
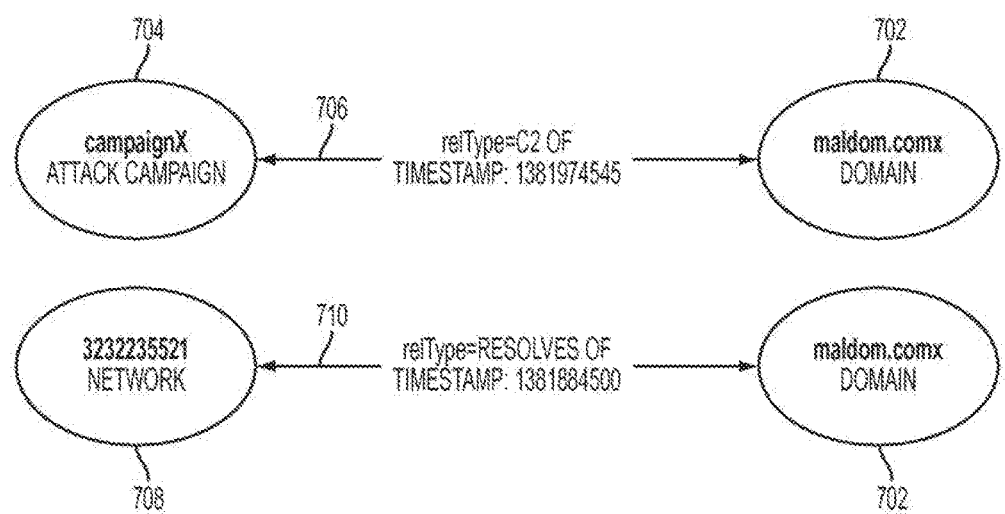
FIG. 7 is an intelligence graph detail illustrating specific events amenable to countermeasure deployment according to some embodiments.

FIG. 7 is an intelligence graph detail illustrating specific events amenable to countermeasure deployment according to some embodiments. Note that although the sub-graph of FIG. 7 is illustrated as two sub-graphs, the two figure portions share node 702; accordingly, the sub-graph of FIG. 7 can be understood as including three nodes 702, 704, 708 and two edges 706, 710. Nevertheless, some embodiments detect sub-graphs amenable to countermeasure suggestion or deployment by matching sub-graphs to templates, where the templates might have as few as one node and one edge. In the examples of FIG. 7, each illustrated sub-graph portion corresponds to an attack template. Thus, domain fundamental instance 702 "maldom.comx" is related to attack campaign fundamental instance 704 "campaign" by the edge 706 "command and control of". Further, domain fundamental 702 instance "maldom.comx" is related to network fundamental 708 instance (or IP address) by the edge 710 "resolves to".

Some embodiments can automatically identify sub-graphs having a corresponding countermeasure by using pattern-matching techniques. Example techniques include those disclosed in in U.S. Pat. No. 8,650,170 entitled, "Systems and Methods for Inter-Object Pattern Matching". Such techniques can accept simple rules that define what a pattern looks like by specifying features of the objects which make up the pattern. An example match template follows.

$campaign:
 type: vertex
 keyType: attack campaign
$malwarefamily:
 type: vertex
 keyType: malware family
$c2rel:
 type: relationship
 relType: c2 of
$infra:
 type: vertex
 keyType: domain
 to match: ($campaign or $malwarefamily) and $c2rel and $infra The match template above includes three conditions (each prefaced by a dollar sign "$") and a match statement.

Applying the match template to the sub-graphs of FIG. 7 yields a match to nodes 702 and 704 and edge 706. The match occurs because the sub-graph satisfies the $campaign, $c2rel, and the $infra conditions. The sub-graph consisting of nodes 702 and 708 and edge 710 only matches the $infra condition, so it does not match the match template.

Embodiments can utilize data from the matching sub-graph to assist in generating a countermeasure. That is, data from the matching nodes and edges may be used to fill in values in a predefined countermeasure template. The template may correspond to, for example, for, say, a SNORT rule. As discussed herein, the sub-graph match template may include data representing the countermeasure template. An example template for a SNORT rule related to the matching sub-graph of FIG. 7 follows.

alert udp any any→any 53 (msg: "DNS request for %($domain)s (command and control server)"; content:"|01 00 00 01 00 00 00 00 00 00|"; depth:10; offset:2; content: "%($domain_escaped)s"; nocase; distance:0; classtype:Trojan-activity; sid:11223344; rev:1;)

Replacing the terms "$domain" with "maldox.comx" in the above countermeasure template yields the following SNORT countermeasure.

[{'device': 'snort', 'countermeasureStr': 'alert udp any any→any 53 (msg:"DNS request for maldom.comx (command and control server)"; content:"|01 00 00 01 00 00 00 00 00 00|"; depth:10; offset:2; content:"maldom|02|comx"; nocase; distance:0; classtype:Trojan-activity; sid:11223344; rev:1;)', 'ruleName': 'snort_domain_c2'}, {'device': 'generic', 'countermeasureStr': 'Block access to maldom.comx', 'ruleName': 'generic_domain_c2'}]

The match template and associated countermeasure template described above may be stored in, for example, a database such as countermeasure rules engine 518 of FIG. 5.

II. Vulnerability Intelligence Generation and Application

Enterprises can include many logical groupings of systems, physical and virtualized, corresponding to function or role. Each of these systems may run software that may have defects or vulnerabilities. When examining software packages installed on groups of systems using prior art products or utilities, the number of systems with packages needing updates is often large. However, because there are business applications that often depend on specific package versions in order to function correctly, system administrators typically cannot keep all systems updated with the latest version. Furthermore, businesses have limited resources and would like to be able to prioritize their vulnerability remediation when remedying everything is not a practical option. Therefore, some embodiments automate identifying and remediating vulnerable systems, thus alleviating some problems caused by the sheer volume of vulnerabilities requiring attention.

Section II discloses techniques for automatically correlating threat intelligence with vulnerabilities in software packages. The techniques permit not only automatically generating machine-consumable intelligence, but also automatically triaging the intelligence with systems. Some embodiments provide a list of systems with vulnerable software packages installed, sorted by threat priority score. In some embodiments, the mitigations, such as by way of non-limiting example automatically upgrading software packages, may be acted upon automatically. Further example mitigations include blocking specific domains or internet protocol addresses from initiating new connections at the system's firewall, or at a firewall protecting a group of systems.

Figure 8:
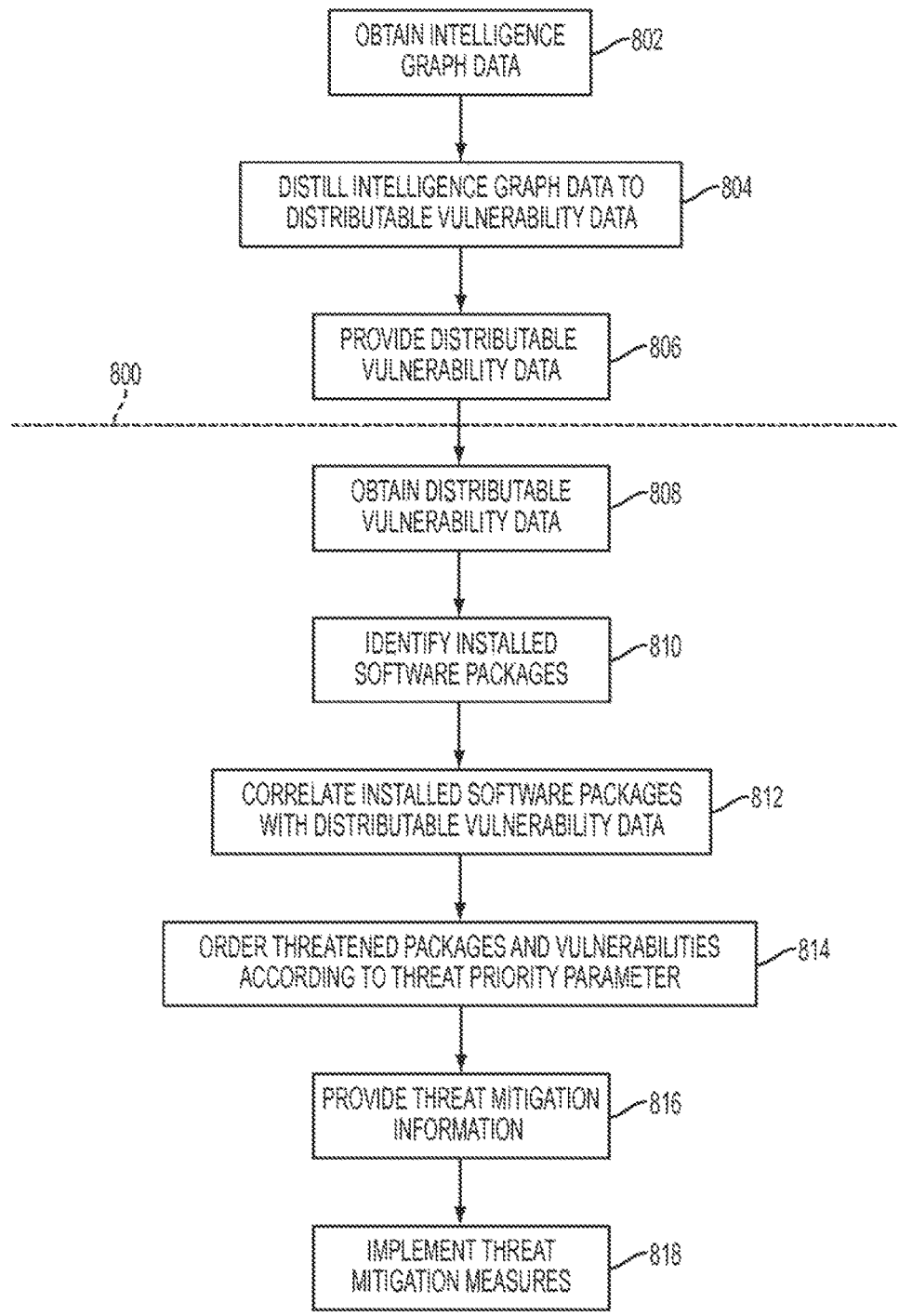
FIG. 8 is a flowchart illustrating a method of automated vulnerability intelligence generation and deployment according to some embodiments.

FIG. 8 is a flowchart illustrating a method of automated vulnerability intelligence generation and deployment according to some embodiments. As demarcated by dotted line 800, blocks 802-806 may be performed by, e.g., a computer security company, and blocks 808-818 may be performed by, e.g., a customer of the computer security company.

At block 802, the method obtains intelligence graph data. The method may obtain intelligence graph data as discussed in Section I, above. In particular, the intelligence graph data may include a graph database file representing all or a portion of an intelligence graph. The represented intelligence graph may include fundamental and document nodes as presented herein in reference to FIGS. 2A, 2B, and 2C. The intelligence graph may represent an amalgamation of data collected from a variety of source and assimilated according to the techniques disclosed herein. The method may obtain the intelligence graph data by, for example, receiving it over a network, accessing a stored copy, or by generating all or part.

At block 804, the method distills the obtained intelligence graph down to distributable vulnerability data. This block may be performed in order to reduce the amount of data that computer security company customers obtain. Further, while the computer security company may desire to retain the entirety of its intelligence graph data, which may include proprietary information, it may not want to limit its customers from receiving information about specific systems or software packages. Accordingly, the computer security company distills the intelligence graph data down into manageable distributable vulnerability data. Note that the distributable vulnerability data may be an entirely separate file, in a different format, than that of the intelligence graph data.

The distributable vulnerability data may be provided in the form of a database file, e.g., in SqLite or JavaScript Object Notation format, or as an XML foe. The data may be formatted using the common vulnerability reporting framework (CVRF) language, available from the Industry Consortium for Advancement of Security on the Internet (ICASI) of Wakefield, Mass., USA.

The distributable vulnerability data may include data reflecting software package and vulnerability pairs extracted from the intelligence graph data. Each software package and vulnerability pair may have associated information in the distributable vulnerability data. As discussed in detail below, such associated information may include any, or a combination, of mitigation information, workaround information, patch information, and a threat priority score. The associations reflected in the distributable vulnerability data may be implemented by way of standard database row and column format, e.g., with each row representing a different package and vulnerability pair, and each column beyond the column(s) representing the package and vulnerability pair representing the associated information.

Extracting data from the intelligence graph may include iterating through each vulnerability node of the intelligence graph to retrieve relevant information. In particular, block 804 may extract a common vulnerability and exposure number from each vulnerability node and insert it into the distributable vulnerability data. The extraction may identify "has vulnerability" or "vulnerability of" edges joined to vulnerability nodes in order to extract information about the software package(s) subject to the vulnerability. Each software package may be represented in the distributable vulnerability data by a name, operating system name, and version. The extraction may also associate a common platform enumeration with each software package, if this information is present in the graph. If not present, block 804 may engage a subroutine to obtain common platform enumeration information from other sources.

The extraction may further include associating with each package and vulnerability pair any mitigation, workaround, and patch information reflected in the intelligence graph. An example of a mitigation is presented above in reference to FIG. 7. An example of a workaround is employing configuration changes to a firewall to include specific blocked IP addresses or domains known to attempt to exploit the vulnerability. An example of a patch is a software update provided by the software provider.

Whether a vulnerability has mitigation (e.g., patch, workaround, etc.) information available may be judged as follows. The iterating through each vulnerability node may include determining, for each vulnerability node, whether documents such as intelligence reports mention it by examining the edges joined to the vulnerability node for the presence of edges with special labels that indicate the related node may contain relevant information, such as "discusses". If so, the subroutine may request and parse the related document nodes to extract any existing mitigation, workaround, and patch data. The mitigation data may be in the form of a template as discussed above in reference to FIG. 7. The extraction may insert the resulting data into one or more columns of the distributable vulnerability data database file. In particular, the subroutine may insert mitigation information into a mitigation information column, workaround information into a workaround information column, and patch information into a patch information column. In some embodiments, this information is inserted into a single column. In some embodiments, the mitigation information may be obtained from a countermeasure rules engine, e.g., 518 of FIG. 5, which itself may obtain the mitigation information from an intelligence graph as described in this paragraph.

Block 804 may also include associating a threat priority score and/or a threat priority signature to each package and vulnerability pair. These threat priority parameters may take into account vulnerability intelligence, threat intelligence, and mitigation possibilities, among other considerations. Example calculations of a threat priority score, a number, and a threat priority signature, a string, follow. In particular, the threat priority score and threat priority signature for a given package and vulnerability pair may be constructed iteratively. As a basis for the iteration, each threat priority score may be initially set to zero. An example starting basis for the iterative construction for the example threat priority signature string is the string, "TPS:/".

If the vulnerability is in a particularly category of badness (e.g., buffer overflow), add one to the threat priority score, otherwise do not add one. Similarly, if the vulnerability is in a particular category of badness, amend the string by appending "/Bad:1", so that the threat priority signature string may be, for example, "TPS://Bad:1". To judge whether a vulnerability is in a particular category of badness, categorization according to common weakness enumeration ("CWE"), provided by MITRE, may be used. In particular, if the vulnerability at issue has a particular CWE, then it is considered to be in a category of badness, otherwise it is not. CWE v2.5 examples that may be associated with badness include, for example, CWE-124, CWE-125, CWE-121, CWE-122, CWE-123, CWE-128, CWE-129, CWE-843, CWE-781, CWE-782, CWE-787, CWE-788, CWE-826, CWE-908, CWE-828, CWE-88, CWE-806, CWE-823, CWE-822, CWE-825, CWE-824, CWE-479, CWE-622, CWE-191, CWE-190, CWE-193, CWE-457, CWE-762, CWE-665, CWE-590, CWE-77, CWE-98, CWE-131, CWE-119, CWE-94, CWE-78, CWE-234, CWE-839, CWE-469, CWE-754, and CWE-587.

Next, if the vulnerability has a high potential for severe impact, add one to the threat priority score; if it has a medium potential for severe impact, add zero, and if it has a low potential for severe impact, subtract one. For the threat priority signature, append the string by adjoining, "/CVSS:n", where n is determined as discussed above in relation to the threat priority score. To judge the impact potential, a common vulnerability scoring system ("CVSS") number, available from the Forum of Incident Response and Security Teams ("FIRST") may be used. The CVSS number may range from 0 to 10, and these values may be quantized into three categories corresponding to +1, 0 and −1. For example, 0-3 may correspond with −1, 4-7 may correspond with 0, and 8-10 may correspond with +1. The CVSS may be obtained by cross-referencing the common vulnerability and exposure number of the vulnerability.

Next, if the vulnerability is active, add one to the threat priority score, otherwise, subtract one. For the threat priority signature, append the string by adjoining, "/Active:m", where m is as discussed above for the threat priority score. To determine whether a vulnerability has an active threat, temporal data may be used. In particular, each vulnerability may have a timestamp associated with when the computer security company first learned of it, and this information may be extracted from the intelligence graph and included in the distributable vulnerability data. If the difference between the time that the threat priority score is calculated and the timestamp exceeds a threshold, then the vulnerability is judged to be non-active, otherwise it is judged to be active. Example thresholds include, e.g., one day, two days, one week, one month, etc.

Next, if the vulnerability has a workaround available, then add zero to the threat priority score, otherwise add one. For the threat priority signature, append by adjoining, "/Workaround:w", where w is determined as described above for the threat priority score.

Next, if the vulnerability has a patch, add zero to the threat priority score, otherwise add one. Likewise, for the threat priority signature, adjoin, "/Patch:x" to the string, where x is as determined for the threat priority score.

Finally, if the vulnerability is associated with a popular software package, then add one to the threat priority score, otherwise add zero. For the threat priority signature, adjoin, "/Popular:p", where p is as determined for the threat priority score. A software package may be determined to be popular according to this technique by tallying vulnerabilities per package over a time span. In some embodiments, only active vulnerabilities are tallied, where "active" is judged as disclosed above. The tallying may be part of the iterating over all vulnerability nodes of the intelligence graph as discussed above in reference to block 804. For example, as the technique iterates over all vulnerability nodes, it may increment a package's popularity count whenever it is subject to a vulnerability, i.e., whenever the package node is joined to a vulnerability node by an "has vulnerability" or "vulnerability of" edge. The counts may be maintained in the distributable vulnerability data. At the end of the iteration, some packages will have higher counts than others, indicating popularity. A threshold may be implemented, such that popularity counts over the threshold indicate a popular package.

The result of these iterative additions and subtractions is an example final threat priority score. The result of the iterative string construction is a threat priority signature, e.g., "TPS://CVSS:1/Bad:1/CVSS:1/Workaround:1/CPE:1/Active:1/Patch:0/Popular:1". Thus, each package and vulnerability pair is provided with a threat priority score and threat priority signature in the distributable vulnerability data.

It is important to note that the actions of block 804 occur automatically, without the need for human intervention. This saves quite a bit of human resource time. In one example embodiment, the inventors estimate that automating the process of block 804 saves the work of dozens of computer security analysts.

The actions of block 804 may occur periodically, on demand, or at other times. If periodic, the actions may be repeated every hour, for example. Note that the intelligence graph data obtained at block 802 is dynamic in that it continually changes as the computer security firm learns of new information. The distributable intelligence data reflects the current state of the computer security firm's knowledge of the described vulnerabilities.

At block 806, the computer security company provides distributable vulnerability data to the customer. The providing can occur several ways. By way of non-limiting example, the distributable vulnerability data may be generated as a response to a representational state transfer (REST) application programming interface (API) query for some CPE, software package name, CVE identification, or threat indicator (URL, domain name, IP address, etc.). Alternately, or in addition, the distributable vulnerability data may be generated by iterating through all CPE strings and compiled into a container, such as a database or large XML file, for distribution.

Per dotted line 800 of FIG. 8, a computer security company may perform the techniques of blocks 802-806, whereas a customer may perform the techniques of blocks 808-818.

At block 808, a computer security customer obtains the distributable vulnerability data. Thus, the customer may obtain the revised intelligence graph data from the computer security company at block 808 on demand, for example. The customer may obtain the data as a data file pushed by or pulled from the computer security company. In some embodiments, the customer obtains the data by interacting with a web service interface, such that the customer may issue particular queries, based on its identification of its installed software packages (see block 810 below), to the computer security company to obtain only the data that is relevant to it, as opposed to obtaining the entire distributable vulnerability data file. In some embodiments, the customer may obtain the information as a single object from a web services API when a user agent requests information about a specific vulnerability or a software package. In some embodiments, the customer obtains the entire file.

At block 810, the customer identifies installed software instances in the customer's computer system. In some embodiments, the computer system is an enterprise network of a company. In some embodiments, the computer system is not represented by the intelligence graph data obtained at block 802. Identification may be performed using a variety of known techniques.

For example, a puppet master, available from Puppet Labs of Portland, Oreg., USA, may be used to query puppet agents under its control to obtain software package status (installed or not) and version number for the system. The puppet master could iterate through the intelligence database by software package name, using synonyms appropriate for the operating systems installed on the agent systems, to query the agent for the status of the software package and the version. The puppet master then would have a list of all systems under the control of the puppet master running vulnerable software.

As another example, Spacewalk, available from RedHat of Raleigh, N.C., USA, may be to apply the intelligence graph database to its already-centralized database of software packages installed on all systems under its control. The systems registered with a Spacewalk server may report the packages installed on a regular basis. Spacewalk could be modified directly, or another process could be run against Spacewalk's database, to iterate over the intelligence database by RedHat RPM package name to identify systems running vulnerable software, presenting a list in the Spacewalk user interface (if modifying Spacewalk) or simply to provide vulnerable systems.

As yet another example, scripts from Fabric, available from Christian Vest Hansen and Jeffrey E. Forci, may be used to either (A) perform the intelligence database vs. installed software package comparison on each system locally, reporting those with vulnerable software packages installed, or (B) centrally query systems for the presence of vulnerable packages to compile a central list of systems running vulnerable software ordered by threat priority score.

Thus, block 810 results in an identification of installed software packages. In some implementations, block 810 also provides some or all of the actions of blocks 812 and 814.

At block 812, the method correlates installed software packages of a computer system with the intelligence graph data. In particular, block 812 determines whether the identified software of block 810 is subject to any vulnerabilities reflected in the distributable vulnerability data. Simple known correlation techniques may be used to that end. In some embodiments, the process of blocks 810 and 812 are combined.

At block 814, the method orders the installed software package and vulnerability pairs according to a threat priority parameter obtained from the distributable vulnerability data. The ordering may be by threat priority score or by threat priority signature. For threat priority score, the ordering may be from lowest to highest score; however, other implementations may differ on whether threat priority scores increase or decrease with higher threat levels. For threat priority parameter, the ordering may be lexicographic, using a fixed ordering of the parts of each threat priority signature, possibly after consistently rearranging them. For example, if ordering using a left-hand-side dominance scheme, then "TPS://CVSS:1/Bad:1/CVSS:1/Workaround:1/CPE:1/Active:1/Patch:0/Popular:1" may come before "TPS://CVSS:1/Bad:1/CVSS:1/Workaround:0/CPE:1/Active:1/Patch:0/Popular:1" because the first string includes "/Workaround:1", whereas the second string includes "/Workaround:0". Other ways to employ known lexicographic or other ordering schemes for the threat priority signature strings may be used.

At block 816, the method provides threat mitigation information. The information may be provided using various techniques. For example, the information may be provided for display as part of a graphical user interface. The threat mitigation information may be in the form of filled out templates, as discussed herein in reference to FIG. 7, for example. The provided threat mitigation information may be presented as being ordered according to the threat priority score or threat priority signature of the respective package and vulnerability pairs.

At block 818, the method implements the threat mitigation measures. Implementation may be automatic. In such embodiments, the order of implementation may be based on threat priority score or signature. While some vulnerabilities may be gauged as more important to address than others according to the respective threat priority parameter, the mitigation implementation process may proceed at least partially in parallel, such that more than one vulnerability is addressed at the same time. In some implementations, the mitigation implementation is controlled by a user, e.g., using a graphical user interface that displays the threat mitigation information. The user may select each mitigation for implementation.

Thus, the threat mitigation measures may be applied manually, automatically, or some combination of the two, to ease the work load on the system administrator. For example, if a mitigation for a particular vulnerability is to update to a specific version of a package, an embodiment may automatically check for the availability of that package in the environment that system runs in and add that information to the output read by a customer. It may also be used to implement that particular mitigation by performing the upgrade for one or more systems automatically or at the direction of the customer.

As another example, a vulnerability may exist in software that allows for a remote user to cause a denial of service, and there may be no update available for the software. Further, the software may be critical to the function of the business. The mitigation information may indicate that a few internet protocol addresses and/or web browser header or data strings could be blocked to limit the exposure of the vulnerability. The mitigation may be implemented by adding those internet protocol addresses to a mechanism to block the traffic from reaching the host, e.g., through an iptables script running on the host, some other block list, or a firewall. Because there may be packet inspection involved, an administrator may add those to some filtering mechanism, such as an intrusion detection system or an intrusion prevention system, to help minimize the exposure of the vulnerable software to attack.

III. Conclusion

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. Further, each hardware component can include persistent storage, such as a hard drive or drive array, which can store program instructions to perform the techniques presented herein. That is, such program instructions can serve to perform the disclosed methods. Other configurations of the first and second devices as discussed herein, and other hardware, software, and service resources are possible.

The foregoing description is illustrative, and variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A method comprising:
   obtaining, by one or more devices and via a computer network, computer-readable data that includes fundamental data and document data;
   preparing, by the one or more devices, a plurality of nodes and a plurality of edges, between the plurality of nodes, by extracting information from the computer-readable data;
   storing, by the one or more devices and in a memory, the plurality of nodes and the plurality of edges as a graph;
   identifying, by the one or more devices, a subgraph, of the graph, that includes a match to a pattern of attack, identifying the subgraph comprising:
      identifying the subgraph after a traversal of at least a portion of the graph is triggered due to data being added to the graph, and
      the plurality of nodes including a node associated with common vulnerability and exposure information;
   obtaining, by the one or more devices and based on identifying the subgraph, a countermeasure corresponding to the subgraph; and
   performing, by the one or more devices and based on the countermeasure, one or more actions for one or more computers impacted by the attack.

2. The method of claim 1,
where the plurality of nodes further include one or more nodes that represent malicious activity,
where the method further comprises:
   traversing the graph starting from the one or more nodes that represent malicious activity, and
where identifying the subgraph comprises:
   identifying the subgraph based on traversing the graph starting from the one or more nodes that represent malicious activity.

3. The method of claim 1, further comprising:
inspecting time data associated with the subgraph,
   where performing the one or more actions based on the countermeasure comprises:
      performing the one or more actions based on the countermeasure and based on inspecting the time data.

4. The method of claim 3, further comprising:
determining that the time data is within a fixed interval of a current time,
   where performing the one or more actions based on the countermeasure comprises:
      performing the one or more actions based on the countermeasure and based on determining that the time data is within the fixed interval of the current time.

5. The method of claim 1, further comprising:
providing, for display, information identifying the countermeasure; and
determining a selection of the countermeasure after providing the information identifying the countermeasure,
   where performing the one or more actions based on the countermeasure comprises:
      activating the countermeasure based on the selection of the countermeasure.

6. The method of claim 1,
where the node is a first node, and
where the plurality of nodes further include:
   a second node associated with one of:
      an internet protocol (IP) address,
      a domain name,
      a uniform resource locator,
      a file system path,
      a software vulnerability,
      an account handle,
      an email address,
      a malware family, an attack campaign,
a network,
a file, or
an autonomous system number, and
a third node that is a document node associated with an intelligence report.

7. The method of claim 1, where the fundamental data includes a malware sample.

8. A system comprising:
a memory; and
one or more processors to:
obtain, via a computer network, computer-readable data that includes fundamental data and document data;
prepare a plurality of nodes and a plurality of edges, between the plurality of nodes, by extracting information from the computer-readable data;
store the plurality of nodes and the plurality of edges as a graph;
identify a subgraph, of the graph, that includes a match to a pattern of attack,
when identifying the subgraph, the one or more processors are to:
identify the subgraph after a traversal of at least a portion of the graph is triggered due to data being added to the graph;
obtain, based on identifying the subgraph, a countermeasure corresponding to the subgraph; and
perform, based on the countermeasure, one or more actions for one or more computers impacted by the attack.

9. The system of claim 8, where the plurality of nodes include one or more nodes that represents malicious activity.

10. The system of claim 8,
where the one or more processors are further to:
inspect time data associated with the subgraph; and
determine that the time data is within a fixed interval of a current time, and
where, when performing the one or more actions action based on the countermeasure, the one or more processors are to:
perform the one or more actions based on the countermeasure and based on determining that the time data is within the fixed interval of the current time.

11. The system of claim 8,
where the one or more processors are further to:
provide, for display, information identifying the countermeasure; and
determine a selection of the countermeasure after providing the information identifying the countermeasure, and
where, when performing the one or more actions, the one or more processors are to:
activate the countermeasure based on the selection of the countermeasure.

12. The system of claim 8, where the plurality of nodes include:
a first node associated with common vulnerability and exposure information,
a second node associated with one of:
an internet protocol (IP) address,
a domain name,
a uniform resource locator,
a file system path,
a software vulnerability,
a software,
a name of a person,
an account handle,
an email address,
a malware family,
an attack campaign,
an event,
an organization,
a network,
a file,
a country,
a region, or
an autonomous system number, and
a third node that is a document node associated with one of:
an intelligence report,
a communication,
an analysis, or
a context.

13. The system of claim 8, where the document data includes one or more of:
intelligence reports,
communication documents,
context documents, or
analysis documents.

14. A non-transitory computer-readable medium storing instructions, the instructions comprising:
one or more instructions that, when executed by at least one processor, cause the at least one processor to:
obtain, via a computer network, computer-readable data that includes fundamental data and document data;
prepare a plurality of nodes and a plurality of edges, between the plurality of nodes, by extracting information from the computer-readable data;
store the plurality of nodes and the plurality of edges as a graph;
identify, after a traversal of at least a portion of the graph is triggered due to data being added to the graph, a subgraph, of the graph, that includes a match to a pattern of attack;
obtain, based on identifying the subgraph, a countermeasure corresponding to the subgraph; and
perform, based on the countermeasure, one or more actions for one or more computers impacted by the attack.

15. The non-transitory computer-readable medium of claim 14, where the plurality of nodes include one or more nodes that represents malicious activity.

16. The non-transitory computer-readable medium of claim 14,
where the one or more instructions further cause the at least one processor to:
inspect time data associated with the subgraph; and
determine that the time data is within a fixed interval of a current time, and
where the one or more actions are performed further based on determining that the time data is within the fixed interval of the current time.

17. The non-transitory computer-readable medium of claim 14,
where the one or more instructions further cause the at least one processor to:
provide, for display, information identifying the countermeasure; and
determine a selection of the countermeasure after providing the information identifying the countermeasure, and where the one or more actions are performed based on the selection of the countermeasure.

18. The non-transitory computer-readable medium of claim 14, where the countermeasure is identified by accessing a first storage source that is different from a second storage source that stores templates that are used to identify the subgraph.

19. The non-transitory computer-readable medium of claim 14, where the plurality of nodes include:
  a first node associated with common vulnerability and exposure information,
  a second node associated with one of:
    an internet protocol (IP) address,
    a domain name,
    a uniform resource locator,
    a file system path,
    a software vulnerability,
    a software,
    a name of a person,
    an account handle,
    an email address,
    a malware family,
    an attack campaign,
    an event,
    an organization,
    a network,
    a file,
    a country,
    a region, or
    an autonomous system number, and
  a third node that is a document node associated with one of:
    an intelligence report,
    a communication,
    an analysis, or
    a context.

20. The non-transitory computer-readable medium of claim 14, where the document data includes one or more of:
  an author name,
  an email address,
  a uniform resource locator (URL),
  an interne protocol (IP) address,
  a domain name,
  a malicious software name,
  a vulnerability identifier, or
  a malware sample.

* * * * *